(12) United States Patent
George et al.

(10) Patent No.: US 8,322,123 B2
(45) Date of Patent: Dec. 4, 2012

(54) METHOD AND APPARATUS FOR STRIPPING MATERIAL FROM A LINE

(75) Inventors: Nigel Hamish George, Amberley (NZ); Marcus James Wickham, Blenheim (NZ); Garry Trevor Love, Amberley (NZ); Albert Arnold Love, Amberley (NZ)

(73) Assignee: Honeypot Holdings Limited, Blenheim (NZ)

( * ) Notice: Subject to any disclaimer, the term of this patent is extended or adjusted under 35 U.S.C. 154(b) by 324 days.

(21) Appl. No.: 12/682,245

(22) PCT Filed: Oct. 17, 2008

(86) PCT No.: PCT/NZ2008/000270
§ 371 (c)(1),
(2), (4) Date: May 18, 2010

(87) PCT Pub. No.: WO2009/051498
PCT Pub. Date: Apr. 23, 2009

(65) Prior Publication Data
US 2010/0281770 A1 Nov. 11, 2010

(30) Foreign Application Priority Data
Oct. 19, 2007 (NZ) ........................................ 562703

(51) Int. Cl.
*A01G 3/04* (2006.01)
(52) U.S. Cl. ........................................................ 56/233
(58) Field of Classification Search ................... 56/16.8, 56/10.2 E, 126, 320, 12.7, 15.5, 233–235, 56/255, 238, 16.7, 17.5, 295; 30/123.3; 144/34.1, 144/34.5, 208.3, 208.8
See application file for complete search history.

(56) References Cited

U.S. PATENT DOCUMENTS

| | | | |
|---|---|---|---|
| 4,198,801 A | 4/1980 | Claxton | |
| 4,251,983 A | 2/1981 | Burton | |
| 4,543,775 A | 10/1985 | Horn et al. | |
| 5,694,753 A | 12/1997 | Dellinger | |
| 5,737,908 A * | 4/1998 | Andelfinger | 56/235 |
| 6,067,715 A | 5/2000 | Hollingsworth | |
| 6,374,538 B1 | 4/2002 | Morris et al. | |
| 6,523,337 B2 * | 2/2003 | Spagnolo | 56/234 |
| 7,293,399 B2 * | 11/2007 | Scott | 56/16.8 |
| 2003/0033749 A1 | 2/2003 | Morris et al. | |

(Continued)

FOREIGN PATENT DOCUMENTS

DE 202004010709 10/2004

(Continued)

*Primary Examiner* — Robert Pezzuto
(74) *Attorney, Agent, or Firm* — Stephen M. De Klerk

(57) ABSTRACT

A method and apparatus (100) for stripping irregular material (2) from a line (1) during relative movement between the apparatus (100) and line (1). The apparatus (100) includes a line guide (200), material guide (210) and stripping mechanism (101). The line (1) passes through the line guide (200). The material guide (210) is configured to guide, constrict, compact and/or re-orientate the irregular material (2) into engagement with the stripping mechanism (101). The stripping mechanism (101) has stripping elements (102) movable with respect to the line guide (200) and line (1) to strip the material (2) from the line (1). The method includes stripping material (2) from a line (1) extending between two end supports (4) and being releasably attached to intermediate supports (3). The material (2) is stripped by causing relative movement between a guide (100) and the line (1) after the line (1) is detached and moved away from the intermediate supports (3).

20 Claims, 20 Drawing Sheets

U.S. PATENT DOCUMENTS

2008/0060335 A1   3/2008   O'Riley

FOREIGN PATENT DOCUMENTS

| | | |
|---|---|---|
| DE | 20 2005 004 907 | 8/2005 |
| EP | 1342405 | 9/2003 |
| FR | 2700917 | 8/1994 |
| FR | 2752360 | 2/1996 |
| FR | 2733118 | 10/1996 |
| FR | 2839609 | 11/2003 |
| SU | 869679 | 10/1981 |
| SU | 1209101 | 2/1986 |
| WO | WO 9736473 | 10/1997 |

* cited by examiner

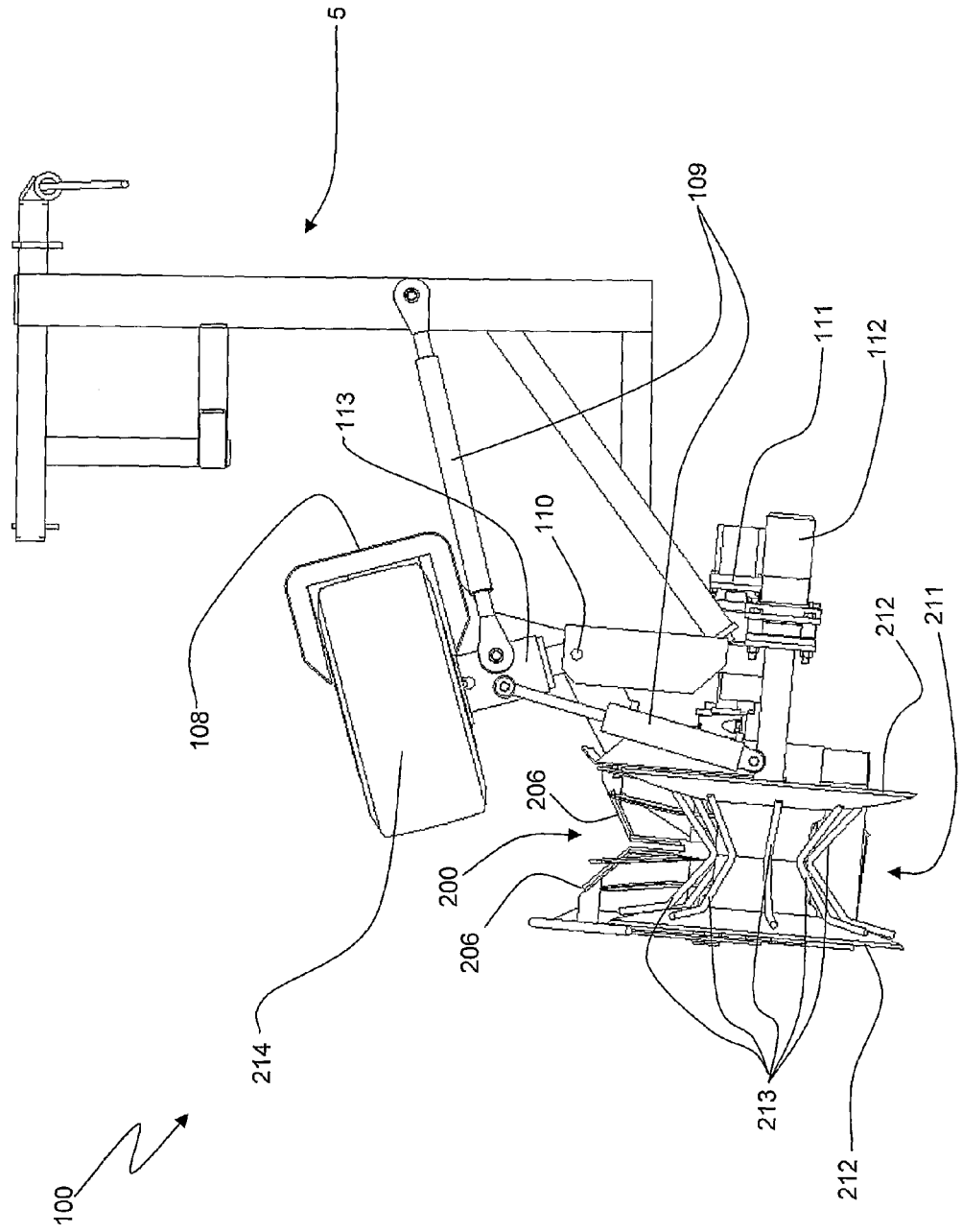

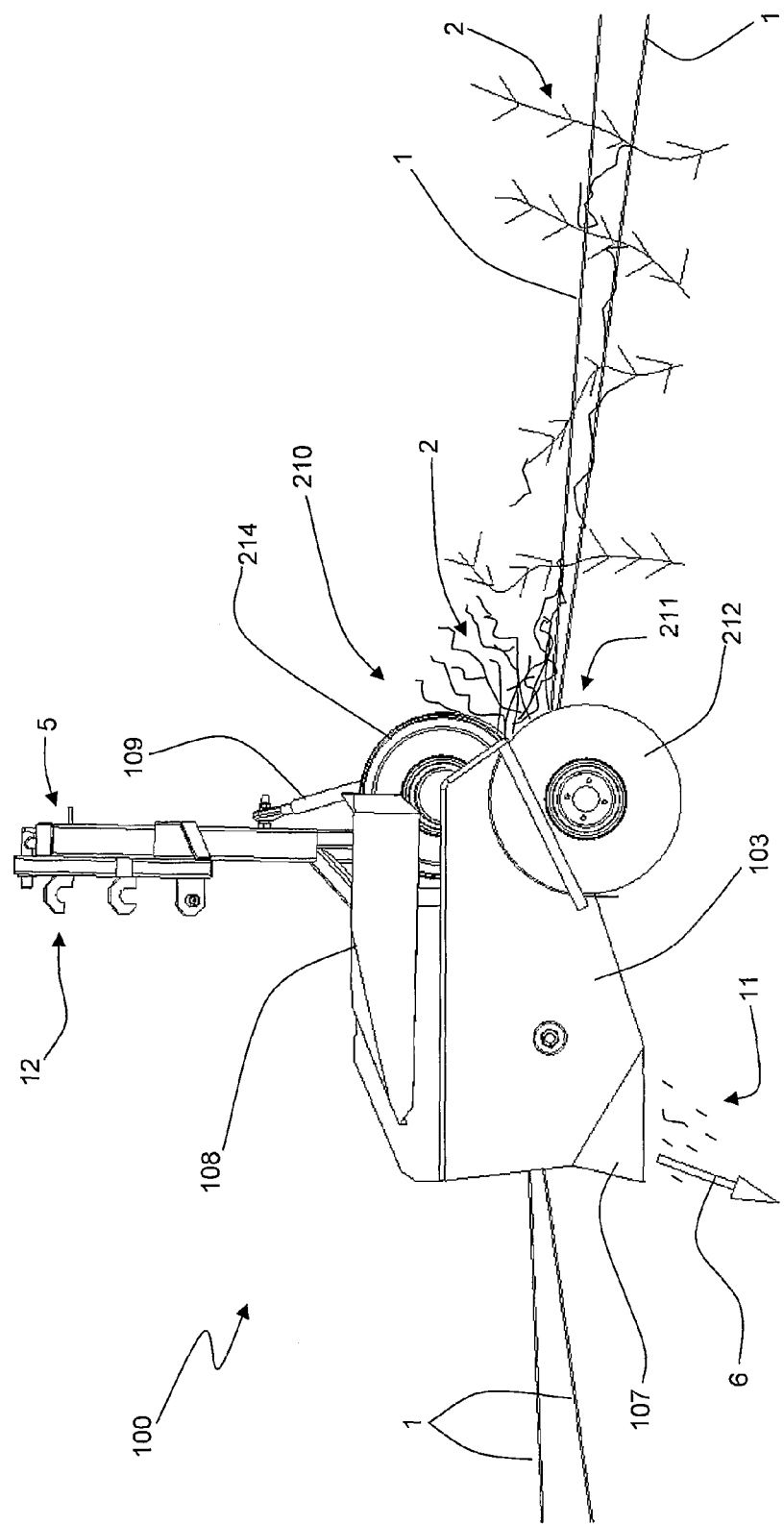

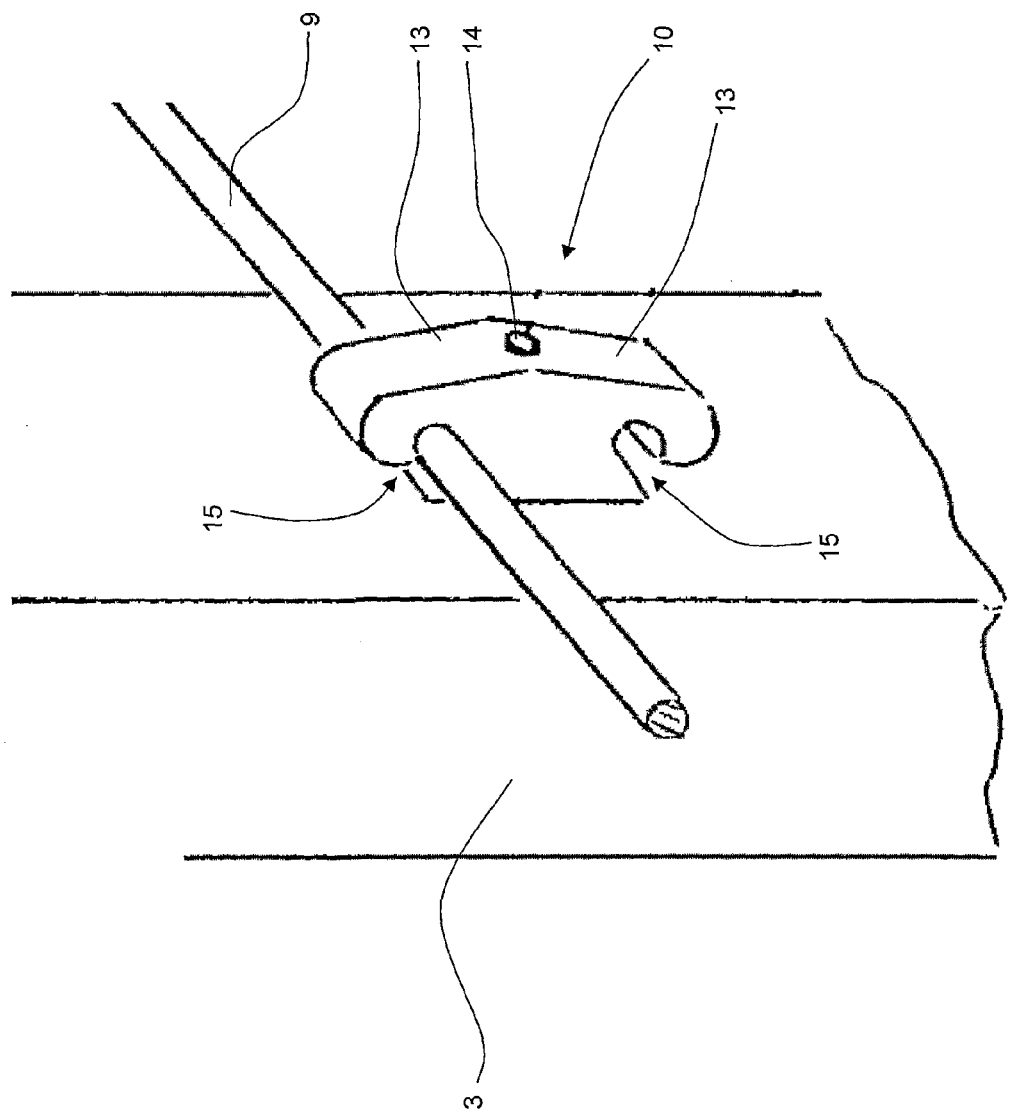

METHOD AND APPARATUS FOR STRIPPING MATERIAL FROM A LINE

STATEMENT OF CORRESPONDING APPLICATIONS

This is a National Phase of International Application No. PCT/US2008/000270 filed on Oct. 17, 2008 which claims priority from New Zealand Patent Application No. 562703 filed on Oct. 19, 2007 and New Zealand Patent Application No. 562703 filed on Jun. 9, 2008.

TECHNICAL FIELD

The present invention relates to methods and apparatus for stripping irregular material from a line.

BACKGROUND ART

To aid clarity and to avoid prolixity the present invention will be described herein with respect to pruning in grape vineyard operations for which the present invention has particular application. However, it should be appreciated that the principles of the present invention may find use in other applications (for example, as described more fully below) and thus reference herein to vineyard pruning should not be seen to be limiting.

As part of annual maintenance of grapevines it is necessary to remove old, weak, diseased, non-productive or otherwise unsuitable "cordons" or "canes" of the grapevine. A "cordon" or "cane" refers to a branch of a woody plant to be pruned or left to bud.

Single plants can be pruned to have single or multiple cordons/canes in a number of methods. The two most prominent methods of pruning are known as "spur-pruning" and "cane-pruning" which suit different types of terroir and grape varieties.

Spur-pruning can be used on any variety but is ideally suited to grape varieties that are fruitful in the bud area near the trunk of the vine. Any shoots growing near the trunk are removed and the vine pruned such that the vine consists of a series of 'spurs' growing from the cordons which are wrapped about a fruiting wire, i.e. a fixed wire to which the cordons are attached. Thus, spur-pruning results in an array of spurs projecting from the cordons at regular distances from the trunk. The spurs are cut back each year to produce new shoots which bear fruit.

Cane-pruning is described more fully below and is typically used on varieties where the buds closest to the trunk are unfruitful or whose bunches are small. Cane-pruning leaves a select few canes each year extending from the trunk to act as the 'fruiting wood'. This selection ensures all the nutrients and energy of the vine are taken up by the select canes and thus promotes a full crop from the selected canes over a shorter time-period. In contrast a vine "spur-pruned" spreads the nutrients and energy over multiple spurs over the growing season.

Spur-pruning produces a relatively greater yield in consistent growing conditions over the season but can result in low yield or quality where conditions are variable or the grape variety is generally low-yielding. For example, frosts may result in poor growth on the closest spurs to the trunk while summer drought may result in poor growth on the outer spurs later in the season. In contrast, cane-pruning ensures most shoots grow simultaneously with all the nutrients and energy being available to the shoots over the season. Thus, while spur-pruning can be used in many climates, the highly variable weather conditions in New Zealand and many other regions require cane-pruning to ensure adequate harvest.

"Cane-pruning" or "cordon-pruning" of unwanted canes from grapevines is a labour intensive operation and can be broken down into four distant tasks as follows:

"Cordon Selection"

The first stage of cane-pruning involves "pre-cutting" to select and cut the unwanted canes away from the head of the vine leaving a number of canes selected with the attributes of:
- originating from an area close to the head or crown of the vine;
- full length and not stunted;
- undamaged and free of disease;
- golden brown in colour;
- having a sufficient number of healthy buds;
- sufficient thickness, e.g. thick or thicker than a human finger.

The cane selection stage is performed manually by a skilled laborer as the selection of appropriate canes can have a high impact on the short and long term productivity of a mature vine.

"Cutting the Unwanted Cane"

The unwanted canes are then cut from the fruiting wire to which they were wrapped about during the previous season's pruning. This cutting makes manual 'stripping' of the cut canes easier. This further cutting process is relatively unskilled compared with the cane selection and is usually performed in tandem with cane selection.

"Stripping Out"

The unwanted canes make up about 90% of the total growth on a mature vine and are often tangled in amongst the foliage, wires or other canes, thereby preventing them from falling away from the vine once cut. These unwanted canes must be removed manually in a process referred to as "stripping-out". Stripping-out generally involves a person gripping the unwanted canes and ripping them away from the vine and wires in a downward motion. Stripping-out can be physically demanding and time consuming. Moreover, stripping-out may also be hazardous when canes are ripped free of the vine as they may whip the person in the face and eyes.

"Trimming and Wrapping"

Once the stripping-out is complete the remaining canes are trimmed to length and shape and wrapped on to the fruiting wire ready for the next growing season. These processes are also done manually and while trimming is generally unskilled, wrapping requires skilled labour.

Thus, cane-pruning of grapevines is a labour-intensive process that has a number of sub-processes requiring skilled workers.

Spur pruning is a faster and less-skilled hand-pruning technique than cane-pruning as there is no selection stage and the spurs are simply pruned back to the required length. The relative simplicity of spur-pruning means that cutting machines can be used to run along the vine and cut the spurs back to a consistent level. In contrast, cane-pruning leaves unwanted canes wrapped about the fruiting wire and thus the cutting techniques of the spur-pruning machines may cut the fruiting wire and/or may not adequately remove the canes.

While a number of machines have been developed to alleviate the heavy manual requirement of spur-pruning grapevines, there has been little development in machines for cane-pruning given the high-skill requirement.

One attempt at reducing at least some of the labour component of cane-pruning has been devised by Walter Langlois[1] and involves locating two contra-rotating vehicle-tyres in a confronting relationship either side of the row of vines. The tyres are positioned above the wires such that the tyres grip the upper portions of the unwanted canes and pull them from the wires. The tyres are attached to the boom of a tractor or the like which can then move along the row of vines.

[1] Perfecting art of stripping, The Dominion Post (NZ), 16 Aug. 2007.

While the Langlois machine does offer a mechanical alternative to manual stripping of the canes, there are a number of problems that may arise in operation. For example:

- the tyres must be lifted over each post along the row of vines thereby reducing speed and efficiency;
- the rotating tyres rip the canes from the wire with substantial force, thereby potentially damaging any uncut canes or detaching the fruiting wire from the posts;
- the stripped canes are ejected upwards from the tyres at substantial speed, and these may land on the tractor, personnel, other vines or otherwise prove inconvenient and unsightly;
- the canes are required to extend above the wire to be effectively stripped which means conventional "pre-pruning" or "summer" pruning must be reduced.

Typical prior art wire strippers are also unsuitable as they cannot be used to strip cut canes of grapevines, other organic material or any inherently irregular material that grows on the line. It is inherently difficult to ensure that all of the material on the line is stripped as the prior art wire strippers rely on the material and line being fixed in position and dimensions, or alternatively rely on the wire stripper blades moving to accommodate any irregularity.

It would therefore be advantageous to provide an improved method and apparatus for stripping the unwanted canes from the fruiting wire.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

To aid clarity and to avoid prolixity, the present invention will be described herein with respect to stripping unwanted irregular material in the form of "cordons" (hereinafter "canes") of a grapevine from a wire for which the present invention has particular application. However, it should be appreciated that the principles of the present invention may find use in many applications that require irregular material to be stripped from a line and thus reference herein to stripping canes from a line should not be seen to be limiting.

By way of example only, the present invention may also have application in:

- other horticultural operations where foliage or other plant material is required to be removed from a wire, line or the like;
- aquaculture and/or marine applications where seaweed, molluscs or other organisms need to be removed from cables, chains, rope or the like;
- removing unwanted foliage from power wires, guy-ropes, cables or the like.

According to a first aspect of the present invention there is provided an apparatus for stripping irregular material from a line during relative movement between the apparatus and line, said apparatus including

- a line guide for positioning the line therein and through which the line may pass during said relative movement;
- a material guide configured to at least partially guide, constrict, compact and/or re-orientate material attached to the line into engagement with a stripping mechanism during said relative movement;
- said stripping mechanism, having at least one stripping element movable with respect to the guide and line, said stripping element being configured in use to impinge on the irregular material, thereby at least partially stripping the material from the line.

As used herein and throughout the specification the term "stripping" refers to the process removing material from an object, (e.g. removing cut grapevines from wires) and should not be seen to be limiting. "Stripping" may include any process, method or means for removing material from an object and by way of example may include cutting, mulching, striking, rubbing, pulling, sawing, ripping, slicing, or any other removal process.

It should also be appreciated that reference herein to the term "stripping" should be understood to include partially and/or fully removing, some, or all material from an object.

It will be understood that reference herein to a "line" refers to any length of material and by way of example includes wire, rope, string, cable, chains, vines, or the like.

As used herein, the term "organic" should be understood to refer to any material of, pertaining to, or derived from living organisms and includes dead plants or animals.

As used herein, the term "irregular material" includes material of varying thickness, length, composition, orientation and/or separation on the line.

As used herein, the term "guide" refers to any member, mechanism, apparatus or system capable of guiding the line therethrough.

As used herein the term "channel" refers to any member(s) having a grooved or furrowed portion, whether continuous or not, extending between open distal ends through which the line may be retained and guided during relative movement of the line and channel.

Preferably, the line guide includes a channel and more preferably a channel with an elongate base and two sidewalls extending between open distal ends, e.g. a 'U'-shaped cross-section. In alternative embodiments, the channel may be 'V'-shaped in cross-section or have an arcuate base for supporting the line.

Preferably the channel is configured such that in use the line may pass through the channel between distal channel ends and be supported by the base between the two sidewalls.

Preferably a front end of the channel forms a mouth, the mouth having one or more deflectors adapted to deflect material from the line passing through said mouth thereby assisting in stripping the material from the line. The deflectors may be formed as sides of the mouth or may be provided separate to the channel.

Cut canes, dust and other detritus can build up in the channel during prolonged use as the detritus enters at the mouth and moves slowly toward the 'rear' of the channel during continued use. This build-up can promote friction and wear on the line travelling through the channel and in extreme cases cause blockages and jamming of the line in the channel. To reduce such build-up, a portion of the channel is preferably tapered toward one end. Therefore, as the detritus passes into the channel at the narrow end of the tapered portion, it will become progressively less constrained by the walls of the channel toward the wider end and thus be more easily ejected from the channel.

Preferably, the channel width is between one and two times the diameter or thickness of the line to be stripped. The line may thus be retained in the channel while not being hampered by any constrictions of the channel.

Preferably, the channel width is between 1.5 to 4 times the diameter or thickness of the line to be stripped.

In a further embodiment, the channel may have an adjustable width and/or height so that an operator can adapt the channel size to the size of the line being stripped.

In one embodiment, the channel may include any one or more of rotating wheels, rollers, buffers, lubricating mechanisms or the like to reduce friction placed on the line as it is travelling therethrough.

As the line and channel may be relatively thin it may be difficult to accurately position the line in the channel without manual intervention. For example, the line may be 4 mm high-tensile wire and the channel of slightly larger width. Thus, where the apparatus is attached to the boom of a carrier, the operator may find it difficult to manoeuvre the guide beneath the line to locate it in the channel.

The line guide therefore preferably includes one or more locator members extending to the channel and configured to guide the line impinging on a said locator member into the channel. Thus, as the line is lifted by the apparatus, the line tension will be directed downwards against the locator member, the line thereby being directed down into the channel by the locator member.

Preferably, two said locator members are provided, one extending to each side of the channel to form a substantially 'V' or 'U' shaped cross-section configuration with the channel at the apex of the 'V' or 'U'. Thus, any line impinging on the inner sides of the arms of the 'V' or 'U' locator members will be guided into the channel.

Preferably, the locator member(s) are inclined in use from the channel between vertical and horizontal.

Preferably, at least two said stripping elements are provided, the line passing between the stripping elements during said relative movement.

Preferably, the, or each, stripping element is rotatable about a rotation axis extending substantially orthogonal to the line during said relative movement.

Preferably, a plurality of said stripping elements are arranged in a spaced relationship along axes parallel to the rotation axis.

Preferably, the, or each, stripping element is attached to a powered rotating hub, axle, shaft or the like such that the, or each, stripping element is rotatable with respect to the guide.

Preferably, the rotating hub is powered by a hydraulic motor. It will be appreciated that the hydraulic motor may be powered by the PTO or hydraulics of a carrier or alternatively a separate generator may be provided. It will be appreciated however that other types of motor or motive means may be used to actuate the stripping elements and reference herein to a hydraulic motor is exemplary only.

Preferably, a plurality of said stripping elements are attached about a circumference of the hub.

Preferably, the stripping elements of the stripping mechanism include one or more blades. The blades are preferably located adjacent the guide and are configured in use to cut and/or dislodge the material attached to the line.

In an alternative embodiment, the stripping elements may include one or more flails, rollers, balls, saws, spikes, mulching flails, crushing rollers, hedge trimmers, or any other means for cutting or removing material from the line.

In vineyard-pruning the unwanted vine material is generally mulched up and used as fertiliser or discarded as rubbish. The unwanted material is thus typically stripped from the line by hand and placed in the avenues adjacent the row of vines. A "chipper" (apparatus used to cut organic material into pieces) or mower is then driven over the discarded material to shred into finer pieces. Thus, by providing cutting blades for stripping the material, the present invention may not only strip the material from adjacent the line, but also cut the material into smaller pieces for disposal or recycling, thereby negating the need for a separate chipping or mulching apparatus.

Preferably the line guide and the stripping mechanism are located substantially within at least two side walls of a housing. Such a housing may help to ensure that all material is guided through the apparatus and is not ejected to the sides.

As the material is irregular, some may extend outside the confines of the housing and be stripped when impinging on the sides of the housing or may otherwise fall away before reaching the stripping mechanism. Any material that does not reach the stripping mechanism thus remains uncut and falls to the ground where it may be unsightly or interfere with vine maintenance.

Thus, the material guide assists in preventing such 'premature' stripping as the material is constricted as it passes through. This constriction ensures the material is constricted and compacted into an area within the confines of the stripping mechanism. The material guide also ensures that the material, regardless of size, is guided and re-orientated into the stripping mechanism to be stripped and/or cut.

The material guide is preferably positioned in front of the line guide with respect to the direction of relative line movement through said line guide and is preferably positioned substantially 'in-line' with the line guide such that material entering the material guide is directed toward the line guide and stripping mechanism.

Preferably the material guide includes a constricting aperture configured to constrict the material as it passes through the material guide.

Preferably, the material guide includes a channel and a constricting member, movable relative to each other between:
  a) a closed position, wherein the constricting member at least partially covers the material guide channel to form said constricting aperture, and
  b) an open position wherein the line can be located in the material guide channel.

The constricting member is preferably rotatable, e.g. the constricting member may be a rotating wheel, roller or the like.

Preferably, the material guide channel is rotatable.

Preferably, the constricting member and/or material guide channel are rotatable in a direction such that the portions thereof that define the constricting aperture have a tangential velocity vector substantially directed toward the stripping mechanism. For example, the material guide channel and constricting member may be contra-rotating annular members rotating in a common plane with the line passing between the annular members in the same plane and in a direction parallel with the tangential velocity of the opposing circumferential portions of the annular members that are closest to each other. Thus, as material passes through the constricting aperture the rotating material guide channel and/or constricting member may contact the material and act as a cam to push the material toward the stripping mechanism linearly, thus constricting and bunching the material together toward the stripping mechanism and reducing the likelihood of premature stripping of the line.

Preferably, at least a portion of the circumference of the constricting member includes protrusions, (e.g. spikes), for assisting in gripping material on the line and guiding the material toward the stripping mechanism.

Preferably, the constricting member has a width substantially corresponding to the width of the material guide channel so that the constricting member can 'fit' inside the material guide channel and define the constricting aperture.

The constricting aperture is thus formed between the constricting member and material guide channel, the line and material thereon being guided through this aperture. This constricting aperture ensures that any material, e.g. grapevine canes, is compacted and funneled into a confined space toward the stripping mechanism, thereby ensuring more effective stripping as well as confining the stripped material for distribution.

Preferably the material guide channel is substantially coterminous with the walls of the housing such that any material within the material guide channel is guided into engagement with the stripping mechanism.

Preferably the material guide channel is formed as an annular groove at least partially circumscribing an outer surface of an annular member such as an annular hub, wheel, spool or the like.

Preferably the material guide channel includes one or more locator members configured with two inclined members joined at an intersection co-incident with said line guide. Such locator members may thus help to align the line with the line guide and minimise lateral movement of the line over the material guide. Such lateral movement is typically undesirable as it may increase frictional contact and promote wear on the line.

It will be appreciated that material on the line when passing through the line guide and stripping mechanism may be ejected upwards, potentially falling onto the carrier, operator or vines. The apparatus therefore preferably includes a cover movable between:
a) a closed position—to at least partially cover the stripping mechanism, and/or line guide, and
b) an open position—wherein the stripping mechanism is substantially uncovered.

The line may thus be positioned in the line guide when the cover is in the open position and the cover then closed during operation to prevent cut canes from being ejected upwards out of the housing.

It will also be appreciated that the material on the line may be forced out when moving over the material guide channel and thereby may not be effectively guided into the stripping mechanism. Thus, in one embodiment, the cover is preferably configured in the closed position to also cover the material guide.

The cover, in combination with the material guide, may constrict and therefore compact and 'funnel' the material toward the stripping mechanism.

Preferably, at least one roller or the like is provided in a position co-incident with the line guide and rotatable about an axis extending substantially transverse to the line.

Preferably, a pair of such rollers are provided, in use the line being held therebetween.

Preferably, the roller is substantially resilient, e.g. manufactured from rubber, nylon, plastic or the like.

Such a roller is able to inhibit transverse movement of the line, e.g. due to lateral line tension, and thereby reduce the likelihood of the line being damaged by moving transversely against the end of the line guide. The roller may also act as an extension of the line guide and material guide, e.g. the line extends from the material guide, through the line guide and then the roller, the line respectively guided by each component.

Preferably a chute is provided to direct stripped material from the line guide and/or stripping mechanism. The chute may form part of the housing as aforementioned or may be provided as a separate member locatable beneath, or to the rear of the guide and stripping mechanism to receive the stripped material.

As used herein, the term "chute" refers to any chute, funnel, tube, trough, shaft or the like that is capable of conveying stripped material from the guide and or stripping mechanism.

It should be appreciated that the chute may be rigid or flexible as required. By way of example, in one embodiment the chute may be formed as an elongate flexible tube that can be repositioned to alter the direction of the cut material.

Preferably, the line is fixed at either end, the apparatus being movable along the line to remove material therefrom. In an alternative embodiment, the apparatus may be held in position and the line moved therethrough.

Preferably, the apparatus is mounted to a carrier such as a tractor, harvester, truck, forklift or the like to provide means to transport the apparatus along said line.

According to a further aspect of the present invention there is provided a method of stripping organic material from a line, said method using an apparatus substantially as hereinbefore described and including the steps of:
positioning the line in the line guide and material guide, and
moving the apparatus relative to the line while actuating the stripping mechanism to strip the organic material from the line.

According to a further aspect of the present invention there is provided a method of stripping organic material from a line extending between two end supports and being releasably attached to one or more intermediate supports, said method using an apparatus substantially as hereinbefore described and including the steps of:
detaching the line from at least one said intermediate support and laterally displacing the line away from same;
positioning the line in the line guide and material guide; and
moving the apparatus relative to the line past the, or each, intermediate support while actuating the stripping mechanism to strip the organic material from the line.

According to a yet further aspect of the present invention there is provided a method of stripping organic material from a line extending between two end supports and being attached to one or more intermediate supports, said method using an apparatus substantially as hereinbefore described and including the steps of:
a) positioning the line within the line guide and material guide;

b) moving the apparatus along the line between two said supports while actuating the stripping mechanism to strip the plant material from the line;

c) separating the line from the line guide and material guide;

d) moving the apparatus around a said support to an opposing side such that the line on the opposing side may be positioned within the line guide and material guide; and e) repeating steps a-b for the line on the opposing side of the support.

Preferably, the line is re-attached to the line retention devices once the line has been at least partially stripped of the material.

According to another aspect of the present invention there is provided a method of stripping plant material from a line extending between two end supports and being releasably attached to one or more intermediate supports, said method including:

causing relative movement between a guide and the line to strip the plant material from the line, and characterised in that before stripping, said line is detached from at least one said intermediate support and is displaced from same to thereby permit the guide to travel along said line without obstruction from said intermediate support.

Plants produce buds that generally grow upwards and outwards from the plant stem to form new plant material. In grape-growing operations the buds tend to grow at a point near the end of the canes and form the bulk of the fruiting potential for the following season's growth. These buds can be very vulnerable to damage and thus, in the methods as aforementioned, the line is preferably moved away from the supports at least partially in a direction substantially similar to the general direction of predominant plant growth to thereby minimise the risk of striking and removing the buds with the line as it is moved away.

It will be appreciated that in most applications the plant growth will be generally upwards and laterally (with respect to the row) outwards away from the cane. In the aforementioned methods, the line is preferably moved upwards and laterally outwards in the same direction.

The aforementioned methods reduce potential damage to the plants by moving the line upwards and outwards as, at least in grape-growing operations, the buds are mostly located in the lee (with respect to the direction of growth) of old leaf scars which can act as natural shields for the buds as the line moves past. If the line was moved downwards and outwards the line could catch and break or damage the budsa and retained canes.

Preferably the organic material includes cut canes of a grapevine.

Preferably, the line is displaced to a position above the, or each intermediate support and more preferably is displaced vertically above and laterally to the, or each intermediate support.

Preferably the line is a wire that extends between two end supports provided in the form of posts of a fence, trellis or the like having one or more intermediate posts, e.g. as is common in vineyards.

Preferably the, or each intermediate support includes one or more line retention devices capable of releasably retaining the line.

It will be appreciated that numerous known apparatus and methods are available for releasably attaching a line to a support and by way of example may include line retention devices such as bent nails, resilient snap-fit clips, clips with releasable locking pins or any other means for releasably attaching a line to a support.

It will be appreciated that by selectively and/or successively detaching the line as the guide moves along the length of the line, the line need not be simultaneously detached from all intermediate supports before stripping.

The prior art techniques of stripping plant material from the line require manual labour, or alternatively mobile machinery that must stop and start to move around the intermediate posts. Moreover, any plant material that is to be retained is vulnerable to damage from the prior art machine strippers moving too close to the remaining material when stripping. In contrast, the method of the present invention, as hereinbefore described, may alleviate both problems by moving the line away from the posts and retained plant material before stripping, thereby allowing the guide to move continuously along the length of line while removing the cut canes and minimising the risk of damaging the retained canes.

Typical grape-growing operations that use the cane-pruning technique (as mentioned in the "background art" section) utilise fixed "fruiting" wires to which the canes are attached as well as multiple "lifting" wires. New growth from the canes is guided by the "lifting" wires which may be periodically lifted over the growing season to train the canes into shape to assist in harvesting, maintenance and sunlight exposure. The lifting wires are necessarily releasably attached to the posts via clips with snap-fit holding portions to permit release for subsequent lifting. However, as there is no detachability requirement, the fruiting wire is typically fixed to the posts vie staples or the like to ensure stability.

Thus, in one preferred embodiment, the method as aforementioned includes the step of releasably attaching a "fruiting wire" to one or more of the intermediate supports before detaching and stripping.

Preferably, both the fruiting and lifting wires are simultaneously stripped together.

It will be appreciated that many of the uncut canes that are to be retained may also be attached to the line even after the unwanted canes are cut. This uncut material must therefore preferably be detached from the line before stripping.

The apparatus and methods of the present invention may also be applied by holding the apparatus stationary while retracting the line through the guide, e.g. in applications such as stripping mussels, molluscs or other organic marine material from lines immersed in water where it may be impractical to move the apparatus along the line. The present invention may thus be readily adapted to suit other stripping applications.

The present invention may thus provide an apparatus and method that may provide significant advantages over the prior art, including a potentially more efficient and expedient method of stripping unwanted material from the line that reduces labour requirements by obviating the need to manually strip such material.

The present invention may also provide an apparatus capable of not only stripping material from the line but also cutting or chopping the material into smaller pieces.

Moreover, the present invention may provide a method and apparatus for stripping cut canes of a pruned grapevine from a wire, thereby reducing the labour requirement in cane-pruning operations.

BRIEF DESCRIPTION OF DRAWINGS

Further aspects and advantages of the present invention will become apparent from the following description which is given by way of example only and with reference to the accompanying drawings in which:

FIG. 8a shows a front elevation of the apparatus of FIGS. 1-7 with the cover in an open position;

FIG. 9 shows a side elevation of the apparatus of FIGS. 1-8 in use stripping cut grapevine "canes" from a wire;

FIG. 19 shows representation of an exemplary line retention clip used in preferred embodiments.

BEST MODES FOR CARRYING OUT THE INVENTION

Figure 1:
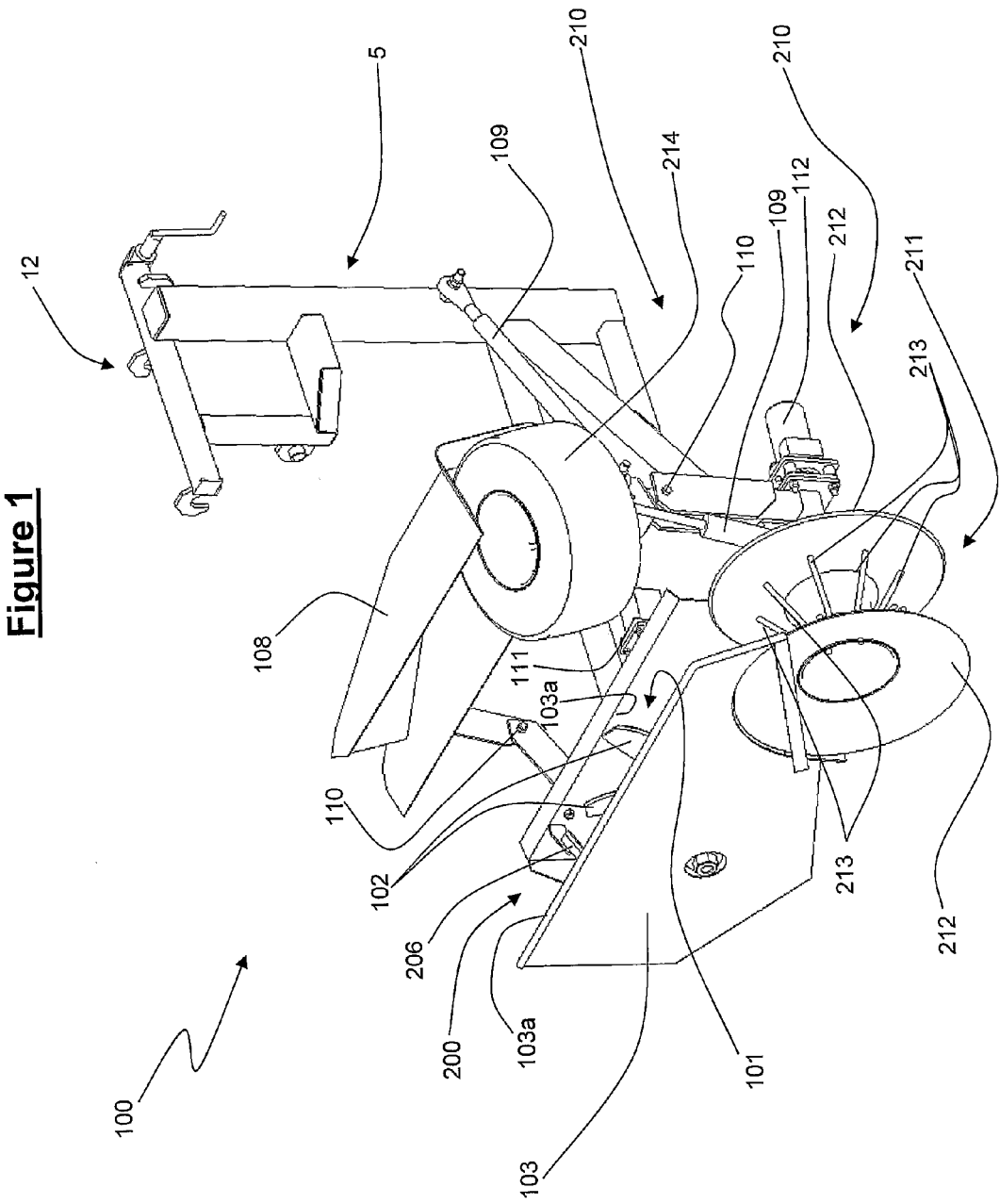
FIG. 1 shows an upper-front isometric view of an apparatus according to a first preferred embodiment of the present invention.
Figure 2:
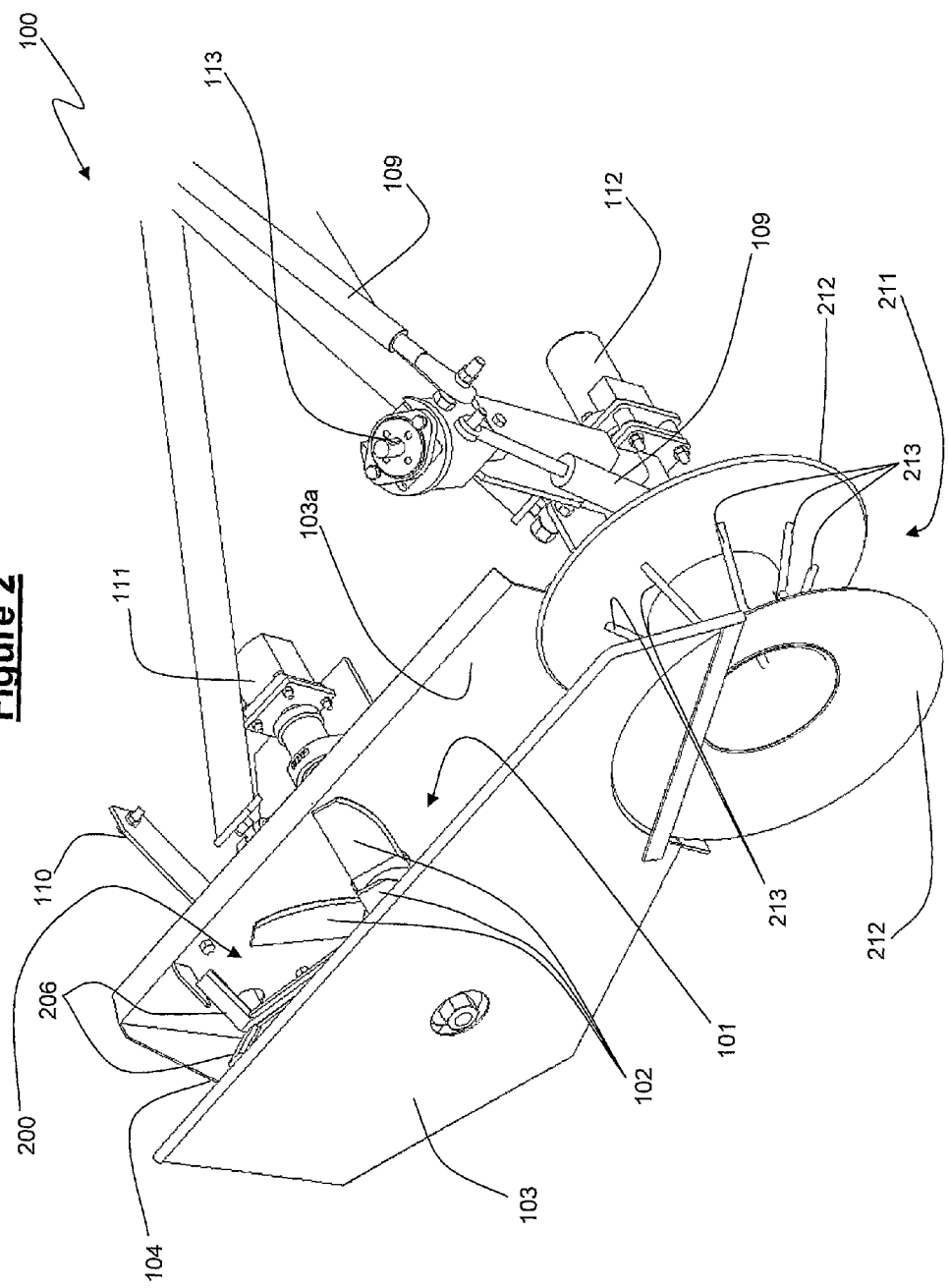
FIG. 2 shows an enlarged isometric view of the apparatus shown in FIG. 1 with the cover removed.
Figure 3:
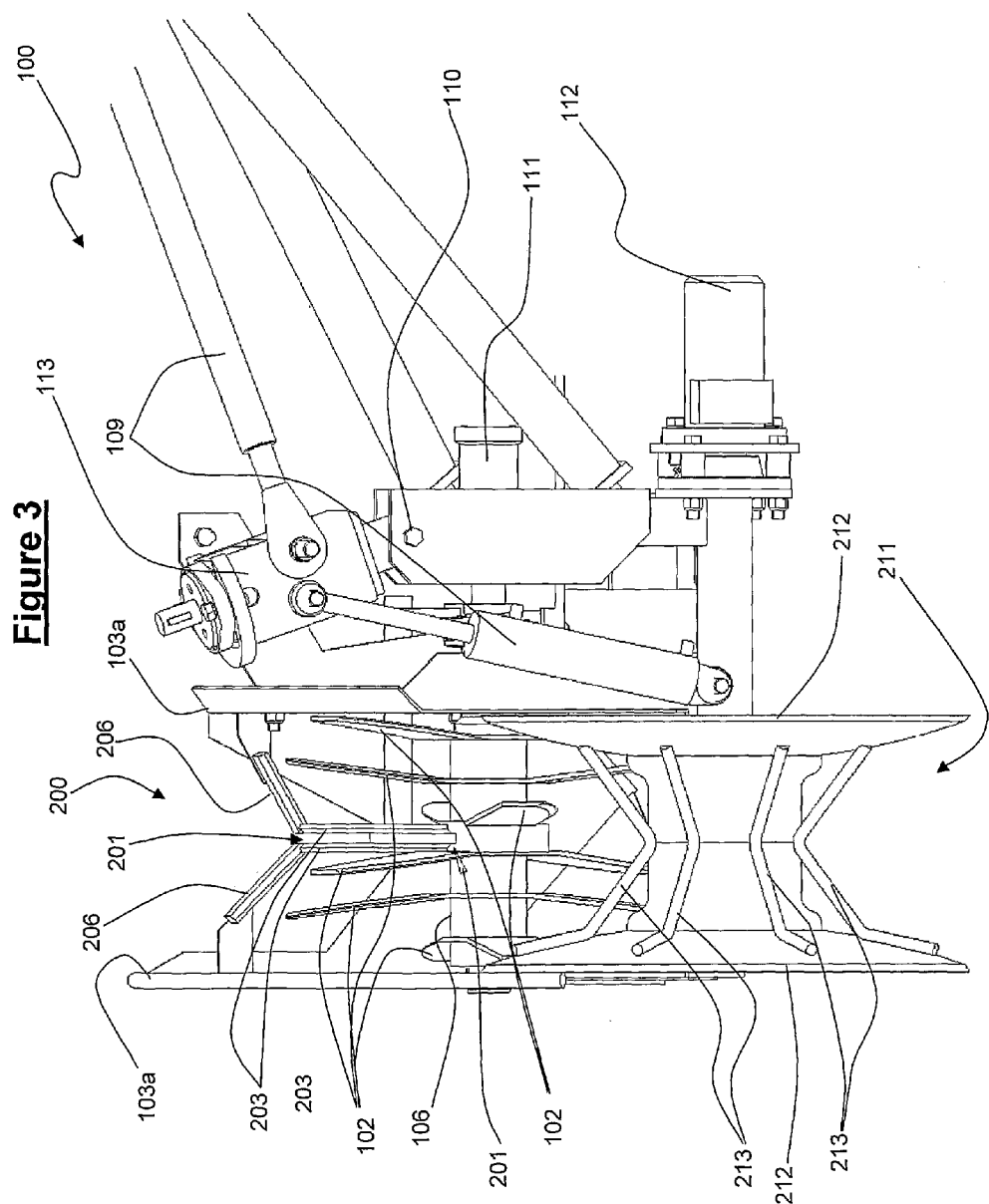
FIG. 3 shows a front elevation of the apparatus of FIGS. 1-4 with the cover removed.
Figure 4:
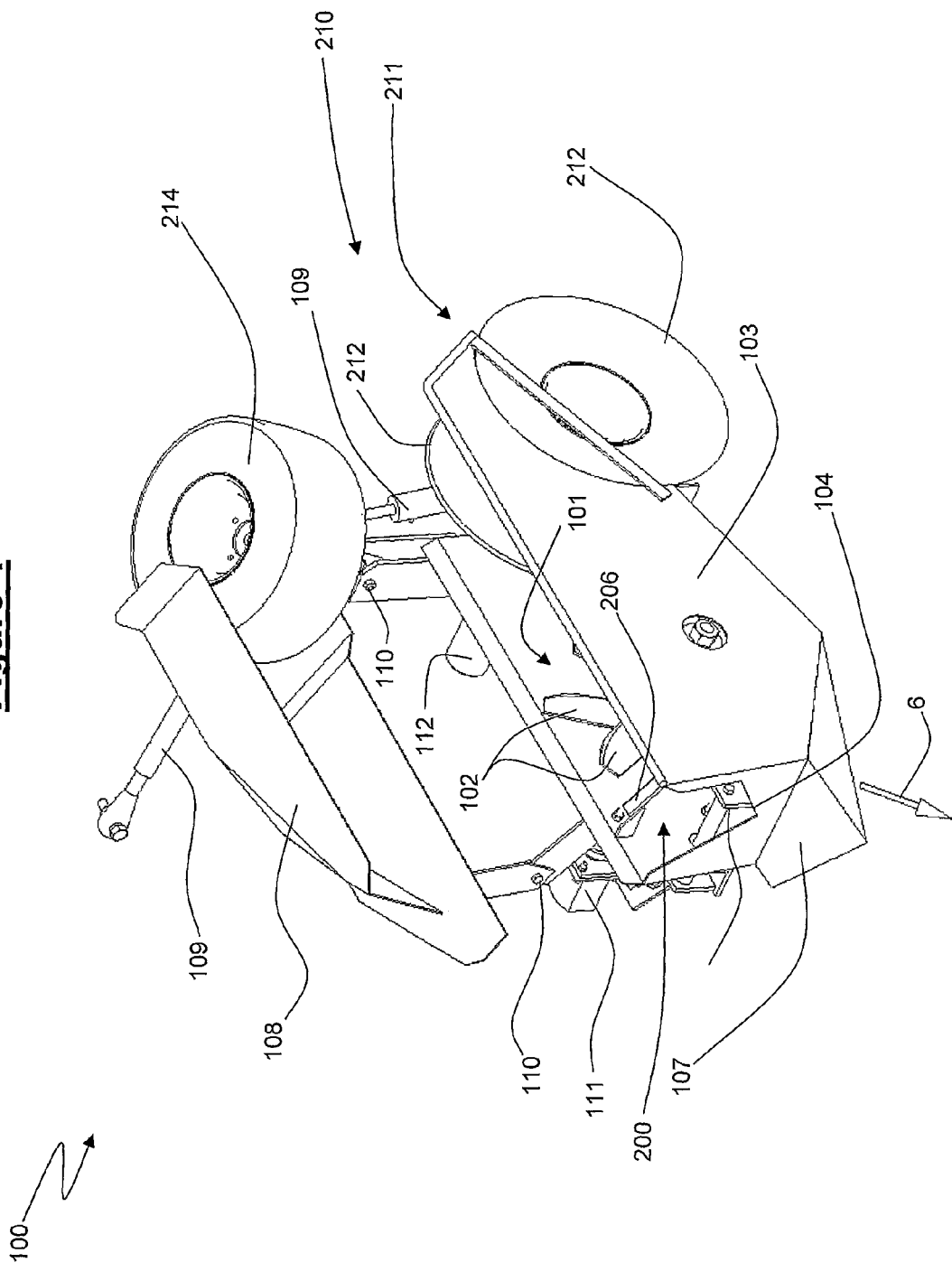
FIG. 4 shows an upper-rear view of the apparatus of FIGS. 1-3.
Figure 5:
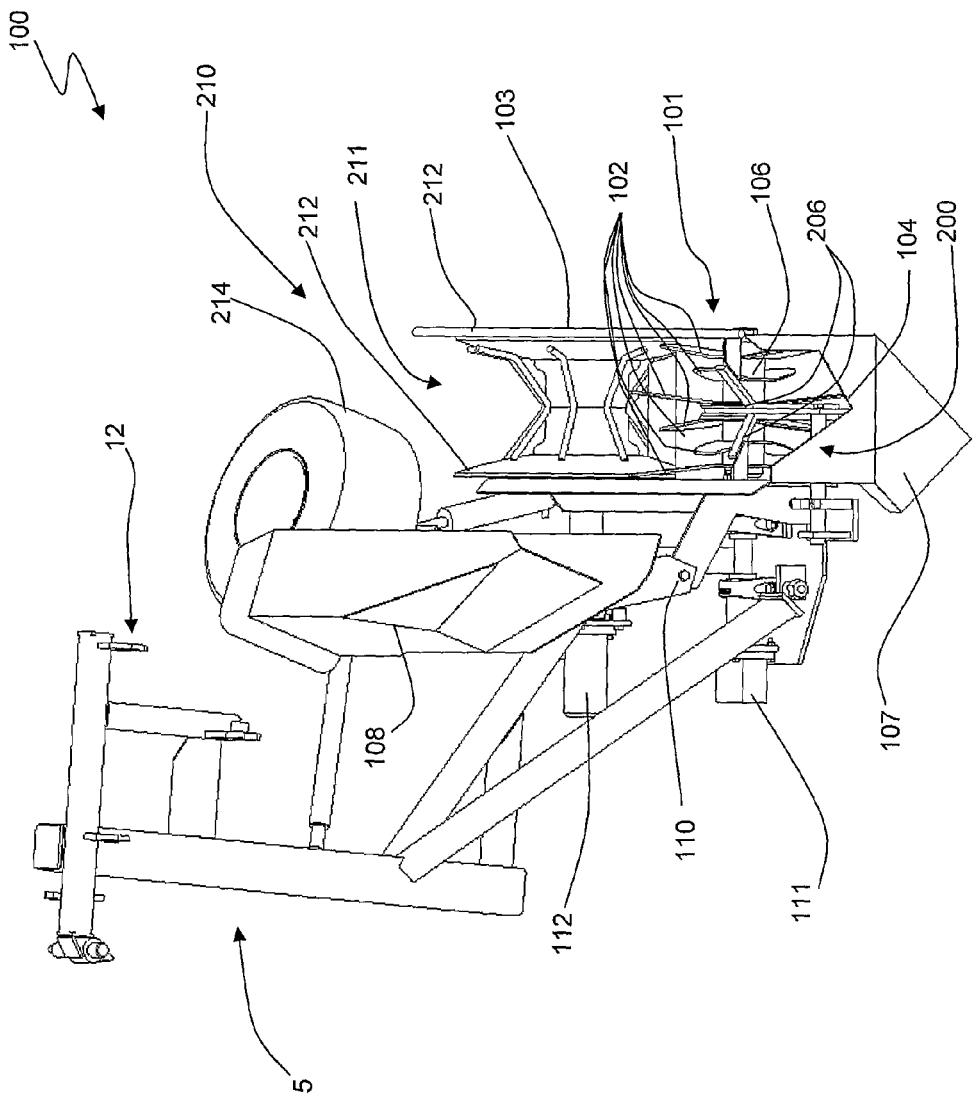
FIG. 5 shows an upper-rear isometric view of the apparatus of FIGS. 1-4.
Figure 6:
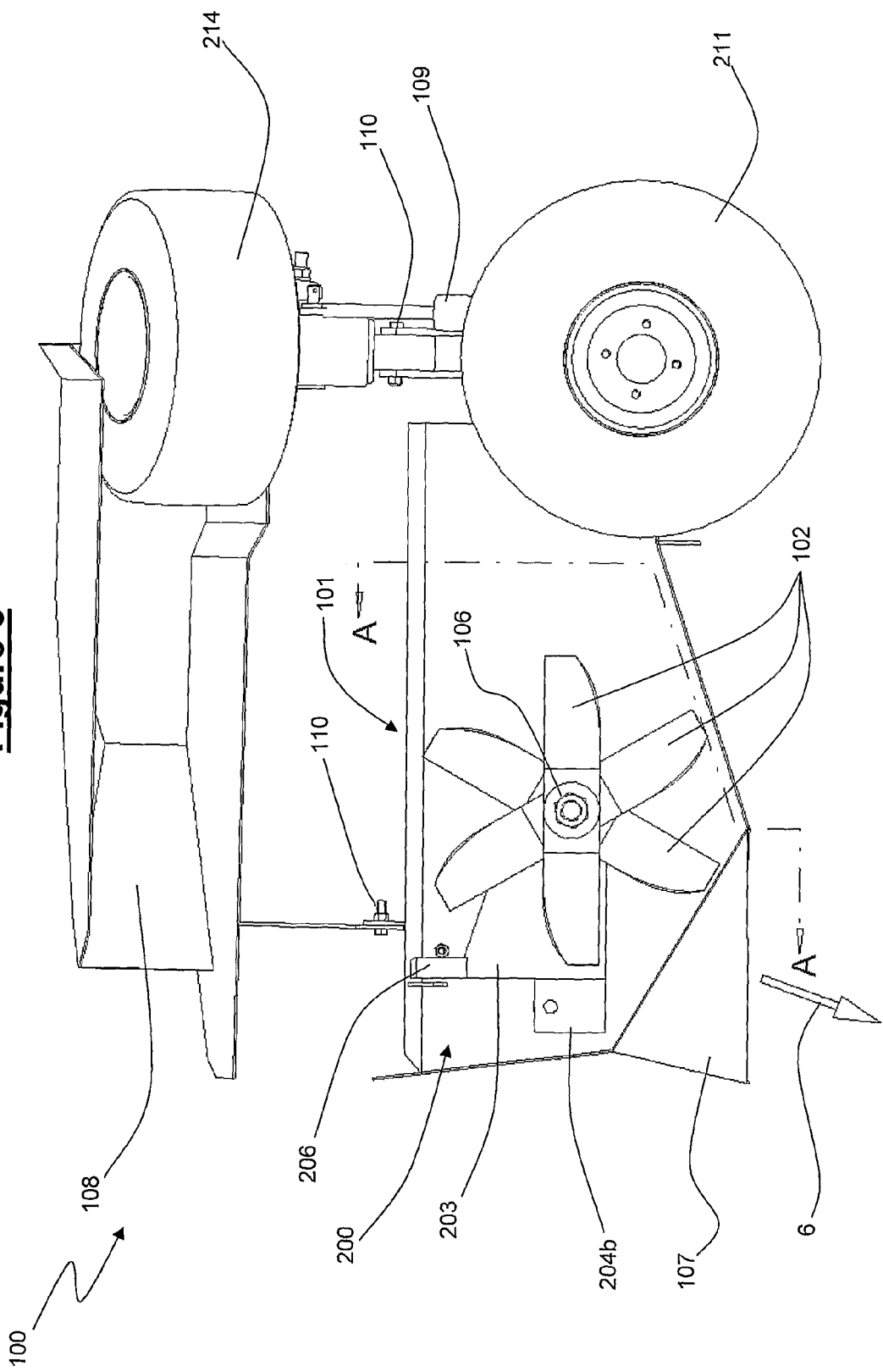
FIG. 6 shows a longitudinal cut-away side-view of the apparatus of FIGS. 1-5.
Figure 7:
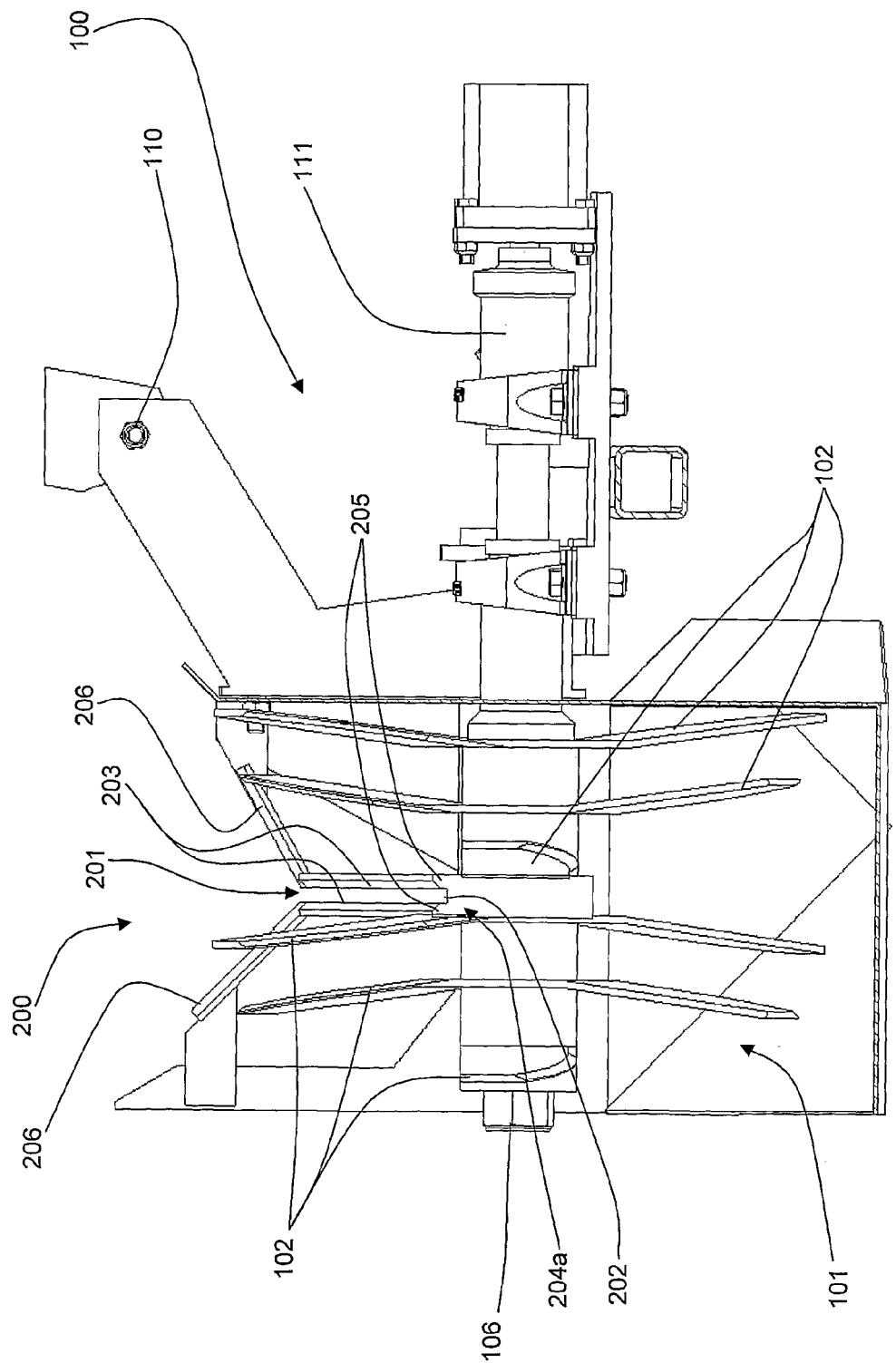
FIG. 7 shows a cross-section of the apparatus of FIG. 6 through A-A.
Figure 8B:
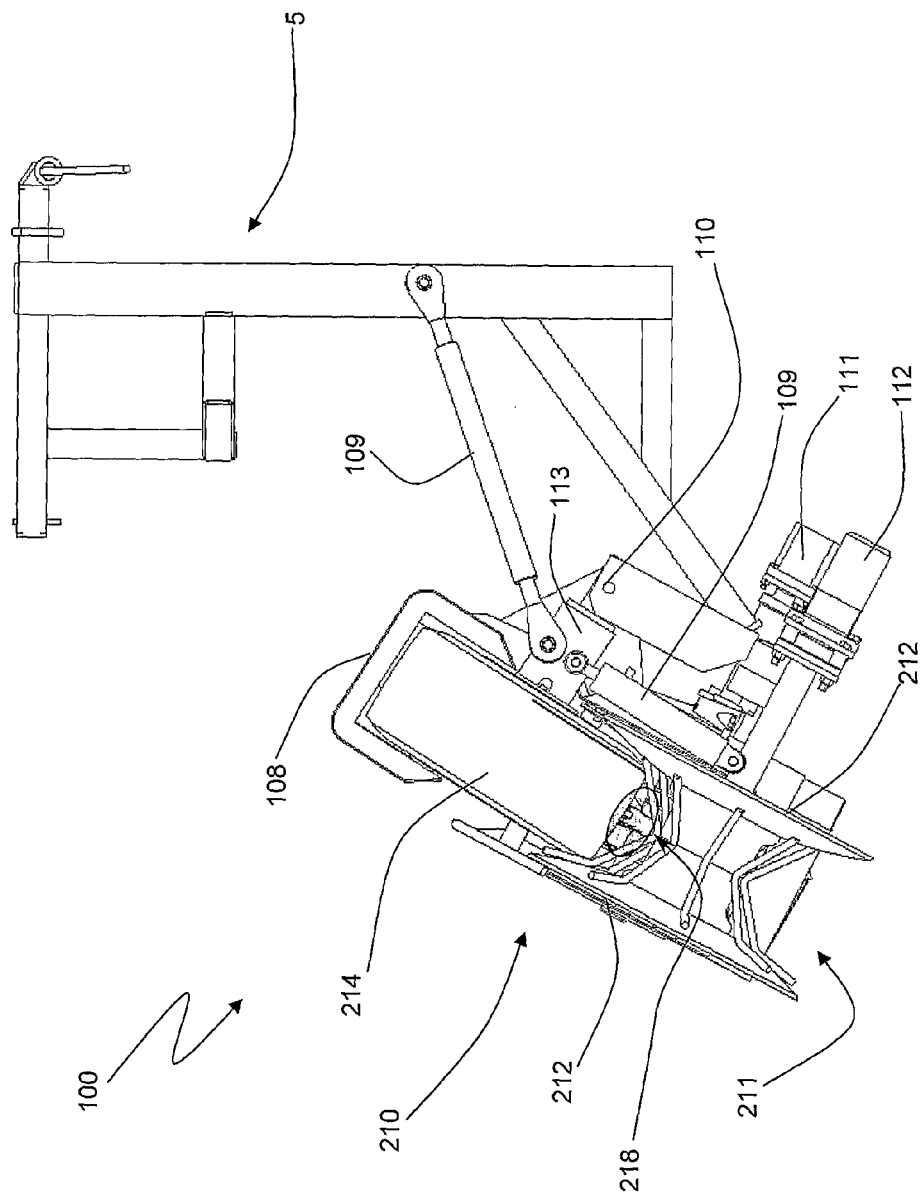
FIG. 8b shows the apparatus of FIG. 8a with the cover in a closed position.

FIGS. 1-11 show an apparatus according to a first preferred embodiment as generally indicated by arrow 100. FIGS. 11-16 show an apparatus 300 according to a second preferred embodiment. The two embodiments 100, 300 are generally similar and thus like parts are referenced similarly.

The apparatus (100) is for stripping irregular material from a line. In the embodiments shown in the figures, the material includes cut grapevine canes (2) while the line is provided as a wire (1, 8, 9) to which grapevines 7 attach as they grow. It should be appreciated that reference herein to stripping canes of a grapevine is exemplary only and should not be construed to be limiting.

Figure 10:
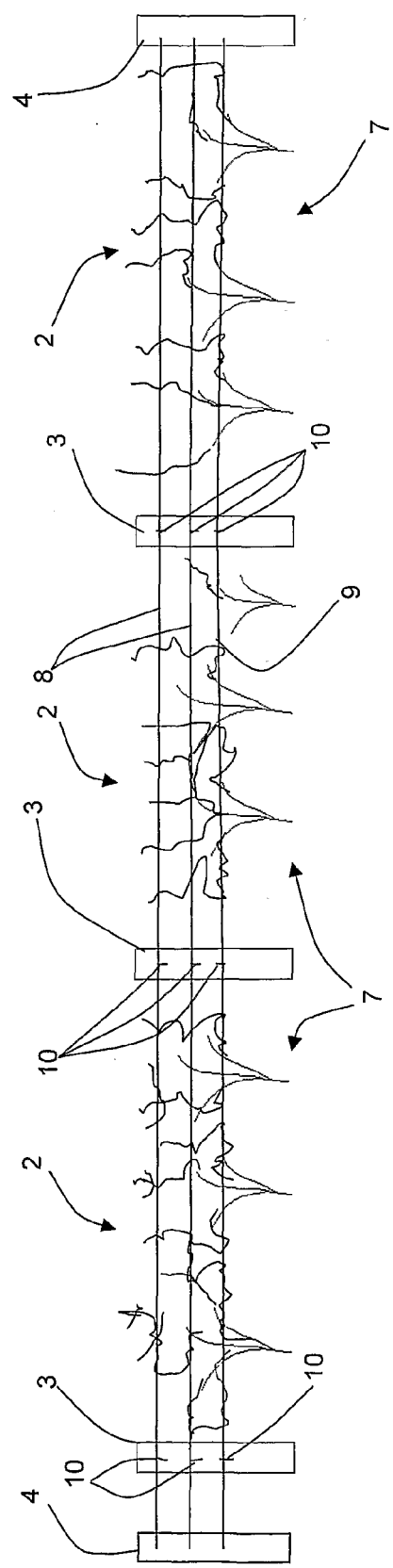
FIG. 10 shows a row of grapevines in a typical cane-pruning arrangement.
Figure 11:
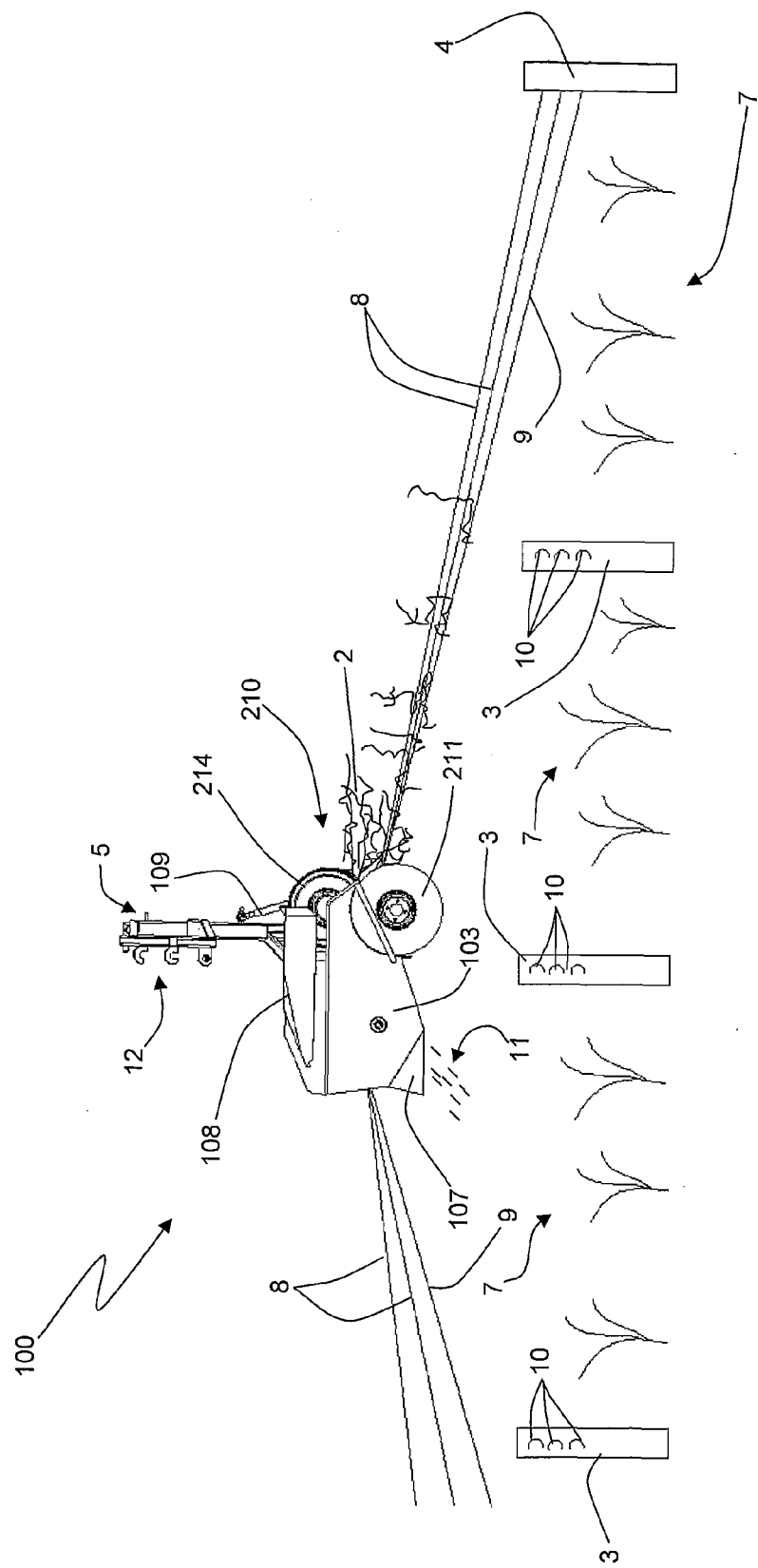
FIG. 11 shows the row of grapevines of FIG. 10 and a method of stripping irregular material from the wires according to one preferred embodiment of the present invention.
Figure 12:
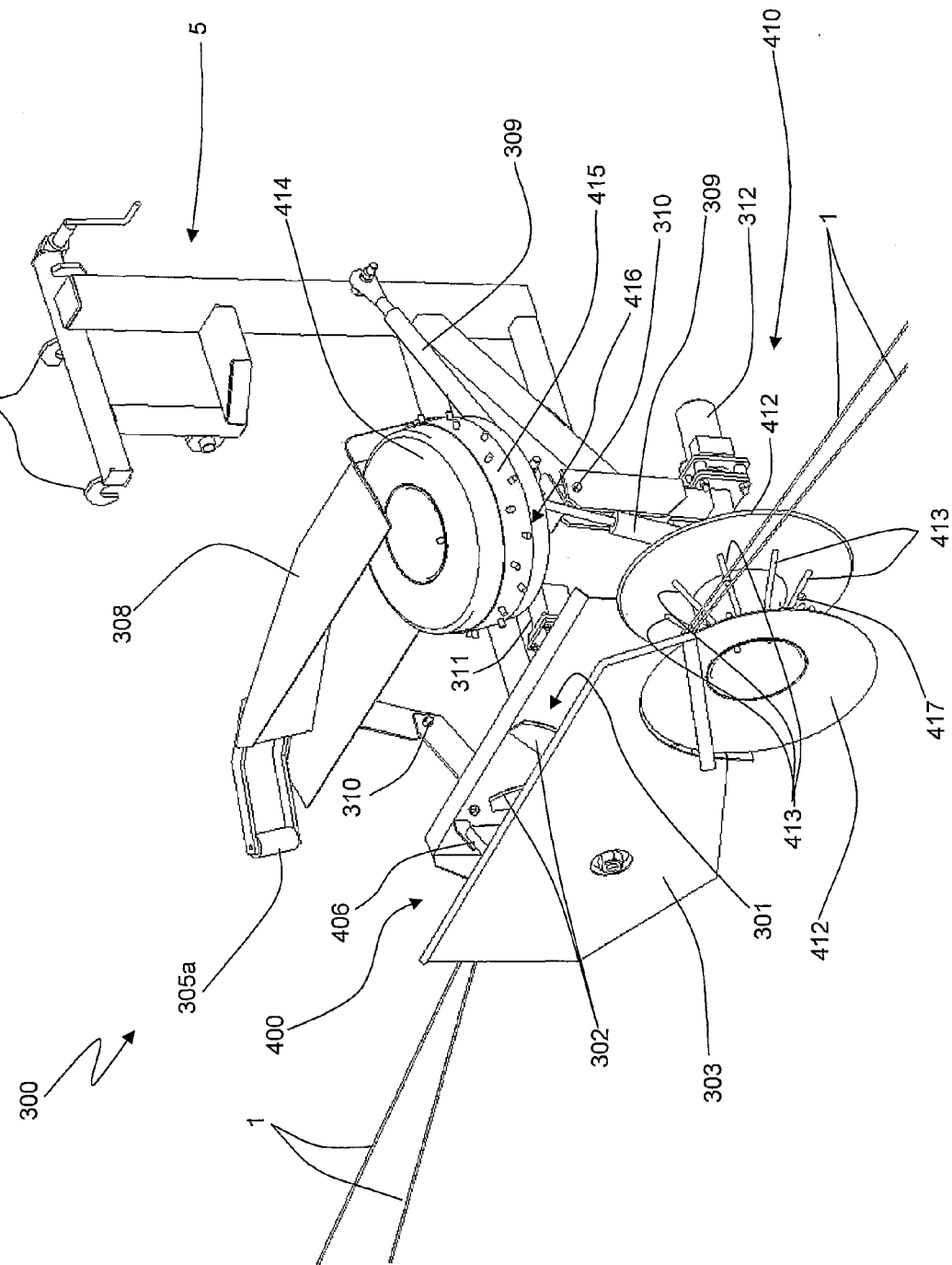
FIG. 12 shows a front isometric view of an apparatus according to a second preferred embodiment.

As shown in FIGS. 10 and 11, wires (8, 9) are fixed at either end to end-posts (4) (only one shown in FIG. 11) and are releasably attached via clips (10) to one or more intermediate posts (3) located between the end posts (4). Vines (7) are planted between the posts (3) and are attached to a fruiting wire (9). During the growing season, the canes (2) are guided upwards by lifting wires (8). The canes (2) are typically attached to the wires (8, 9) with clips, vine-ties or similar, such as the clip (10) shown in FIG. 19. The grapevines (7) also grow and wrap themselves about the wires (8, 9).

After the growing season, the vines (7) must be pruned to remove all material apart from a few select canes that have desirable attributes, e.g. originating from an area close to the head or crown of the vine, not being stunted or diseased and having a sufficient number of healthy buds. These pruned canes (2) are still attached and wrapped about the wires (8, 9) and must be removed to prevent disease and make space for new growth in the following season. In the prior art, such canes were manually 'stripped-out" at great labour expense.

The present invention aims to remove this manual stripping requirement using a method and apparatus as described below.

The apparatus (100) of the first embodiment will now be described with respect to FIGS. 1-11.

In use, the apparatus (100) is mounted to a frame (5) that can be mounted to the 'boom' of a tractor, harvester or other carrier (not shown). The tractor is thus able to transport the apparatus (100) relative to the wire (1) and alongside the row of grapevines (7). The tractor boom is of adjustable height which thereby allows the apparatus (100) to be raised and lowered as required. The frame (5) is attached via a known standardised attachment mechanism (12) such as a "Euro-Hitch".

The apparatus (100) has a line guide (200) into which the wire (1) is to be located and through which the wire (1) will pass during relative movement of the apparatus (100) and wire (1).

A stripping mechanism (101) is provided adjacent the line guide (200) and has stripping elements provided in the form of six rotating blades (102). The wire (1) passes through the line guide between the blades (102) so that any material attached to the wire (1) is cut away by the blades (102) and/or dislodged as the wire (1) passes through the line guide (200). The wire (1) is thus protected from the rotating blades (102) by the walls (203) of the line guide (200).

The line guide (200) includes a channel (201) with an elongate base (202) and two sidewalls (203) extending between open distal ends (204a, b) in a 'U'-shaped cross-section. The wire (1) is supported by the base (202) and confined between the two sidewalls (203) as it passes through the channel (201). The channel front end (204a) forms a mouth. The mouth (204a) has two deflecting edges (205) adapted to deflect material from the wire (1) passing therethrough, thereby assisting in stripping the canes (2) from the wire (1) and reducing the risk of the canes (2) jamming in the channel mouth (204a). The channel walls (203) increase in height from the channel base (202) toward the rear end (204b), i.e. the 'depth' of the channel (201) increases toward the rear end (204b). These tapered walls (203) thus deflect and strip any canes (2) from the wire (1) as it passes through the line guide (200).

The line guide (200) also has two locator members (206) extending to the channel (201) to form a configuration substantially 'V'-shaped in cross-section, with the channel (201) at the apex of the 'V'. During operation, the wire tension is generally downwards towards the base (202) and with a partial lateral tension component due to the wire (1) being pulled laterally away from the posts (3). The locator members (206) thus assist in guiding the wire (1) into the channel (201) when the wire (1) impinges on a locator member (206). The locator members (206) thereby allow an operator to locate the wire (1) within the channel (201) by maneuvering the apparatus (100) beneath the wire (1) and then lifting to push the locator members (206) against the wire (1) to guide it into the channel (201). The locator members (206) thus allow the wire (1) to be located in the channel successfully without requiring extreme precision.

The blades (102) of the stripping mechanism (101) are attached to a rotating hub (106) powered by a hydraulic motor (111) to rotate the blades (102) (with respect to the wire (1)) in planes parallel with the channel (201) and wire (1). The cutting blades (102) can thus cut the canes (2) adjacent the wire (1) into smaller particles for disposal or recycling, thereby alleviating the requirement for a separate chipping apparatus.

The hydraulic motor (111) is powered from a hydraulic 'power pack' (not shown) of known type. This 'power pack' is driven by the Power Take-Off (PTO) of the tractor carrying and powering the apparatus (100). Utilising such a PTO-driven power pack ensures the apparatus (100) does not need to take power from the integral hydraulics of the tractor which may, for example, be otherwise required for lifting the boom or powering other componentry. A further advantage of utilising a PTO-driven hydraulic power pack is to increase compatibility with various tractors and other carriers, i.e. the apparatus (100) can be mounted and powered by any tractor, harvester or carrier with a PTO, rather than fitting only to carriers with integral hydraulics.

The apparatus (100) has a housing (103) with two sidewalls (103a) either side of the stripping mechanism (101). The housing (103) has a 'rear' end with a 'V' cut (104) through which the wire (1) passes after being through the line guide (200). The housing (103) has a chute (107) positioned below the line guide (200) and stripping mechanism (101) to funnel stripped and cut material in a predetermined direction as indicated by arrow 6. The predetermined direction preferred is generally onto the base of the vines (7) though it will be appreciated that the chute (107) can be directed in any desired direction, e.g. into a container.

The apparatus (100) also has a material guide (210) that is located in front (in use) of the line guide (200). The material guide constricts, compacts and/or re-orientates the canes (2) attached to the wire (1) into engagement with the blades (102) of the stripping mechanism (101). The material guide (113) is formed from an annular material guide channel (211) and a constricting member provided in the form of a rotatable wheel (214). The wheel (214) is movable into the material guide channel (211) (see FIGS. 8b, 9 and 10) to create an entry aperture (218) into the housing (103). The wheel (214) has a width matching the internal width of the material guide channel (211) although sufficiently smaller such that relative movement between the wheel (214) and material guide channel (211) is not substantially impeded.

The wheel (214) can also be moved to an 'open' position (see FIGS. 1, 3, 4, 6 and 8a) to allow the wire (1) to be located/removed in/from the material guide channel (211).

The material guide channel (211) is bound by two annular flanges (212) which are coterminous with the housing (103) such that any canes (2) passing through the material guide (210) between the material guide channel (211) and wheel (214) are guided into engagement with the blades (102).

The material guide channel (113) and wheel (214) are both contra-rotatable and are respectively driven by hydraulic motors (112, 113) powered by the same power pack as hub motor (111). The rotating material guide channel (211) and wheel (214) thus act to grip the canes (2) and guide them through the constricting aperture (218) to form a compacted bundle of canes (2) that are then ejected toward the stripping mechanism (101). The material guide (200) also re-orientates the canes (2) in a direction generally transverse to the blades (102). Without such a material guide (210), the irregularly arranged canes (2) are likely to be stripped prematurely by the edges of the housing walls (103a) or may not be cut effectively.

The material guide (210) has a number of 'V' shaped locator members (213) configured with the apex of the 'V' in line with the channel (201) of the line guide (200). Such locator members (213) align the wire (1) with the line guide (200) and minimise lateral movement of the wire (1) over the material guide (210). Such lateral movement is undesirable as it may increase frictional contact and promote wear on the wire (1) as it enters the channel mouth (204a).

A movable cover (108) is attached to the wheel (214) and is mounted to the housing (103) via two pivoting mount connections (110). The cover (108) is movable in response to actuation of two hydraulic rams (109) pushing the cover (108) about the pivot mounts (110) between a closed position (see FIG. 8b)—to cover the line guide (200) and stripping mechanism (101), and an open position (see FIG. 8a)—wherein the wire (1) can be placed into the line guide (200) and material guide channel (211). The cover (108) thus prevents cut canes from being ejected upwards out of the housing (103).

The hydraulic rams (109) are also configured to increase the angle of the chute (107) (with respect to horizontal) when the cover (108) is closed. This inclination ensures the cut canes are ejected onto the base of the vines (7).

In operation, the canes (2) may bunch and twist as they enter the material guide channel (211) and can potentially block the aperture (218) or jam the wire (1). To alleviate this problem, a force transducer (not shown) is provided between the wheel (214) and cover (108) to monitor the relative forces on the wheel (214) as canes (2) pass through the material guide (210). Where the forces detected by the transducer exceed a set threshold, control circuitry is configured to automatically actuate the hydraulic rams (109) to increase the spacing between the wheel (214) and material guide channel (211), i.e. enlarging aperture (218) to allow the canes 2 through to the stripping mechanism (101).

The second preferred embodiment will now be described with respect to FIGS. 12-18.

The apparatus (300) of the second preferred embodiment is generally, similar to the apparatus (100) with predominately similar components and will therefore be described only with respect to the differences to the first embodiment.

The apparatus (300) has a line guide (400), stripping mechanism (301) and material guide (410) of generally similar form to the line guide (200), stripping mechanism (101) and material guide (210) of the apparatus (100).

Figure 18:
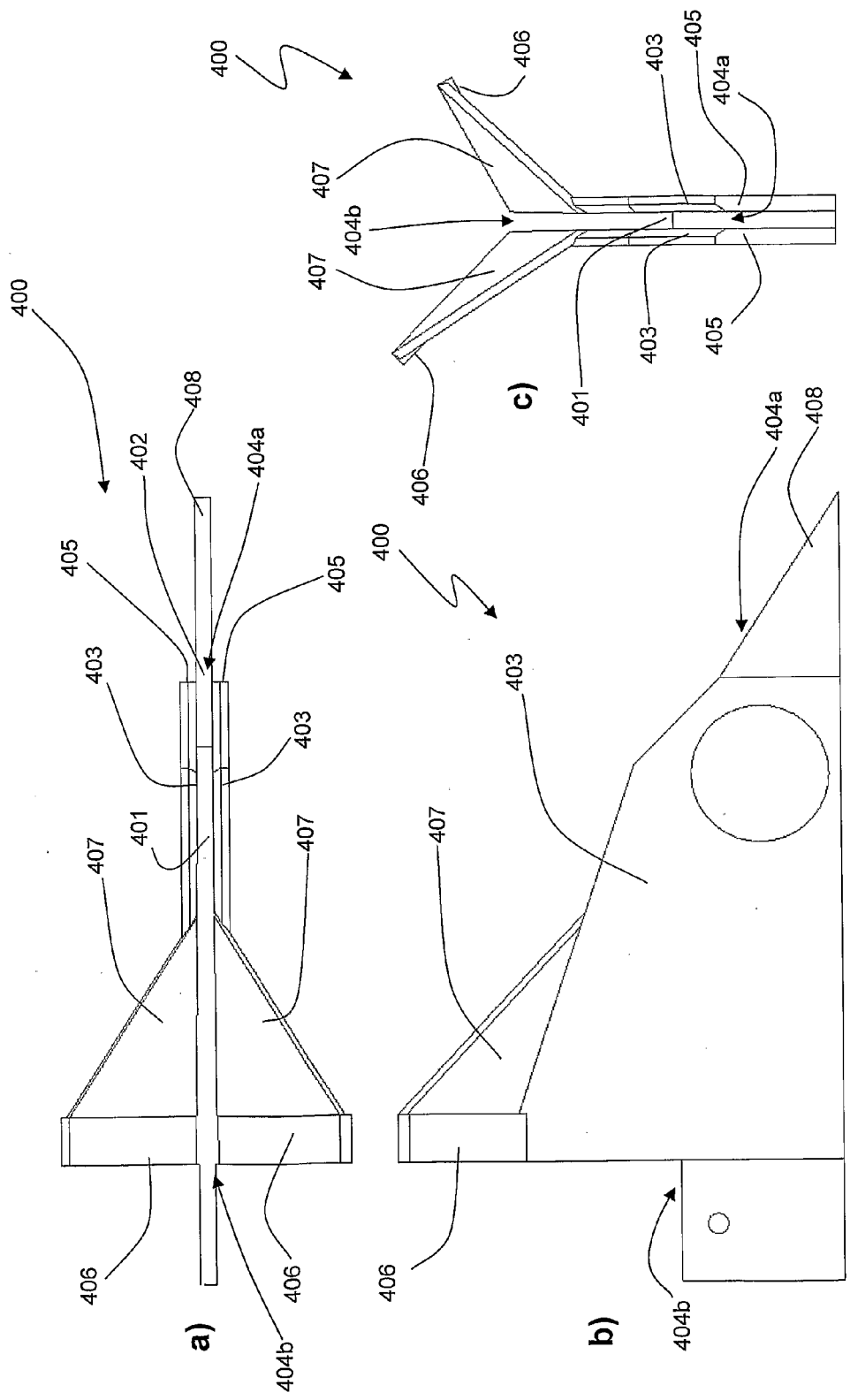
FIGS. 18a-c respectively show plan, side and front elevations of the apparatus of a line guide according to one preferred embodiment.

An enlarged view of the line guide (400) of the second preferred embodiment (300) is shown in FIG. 18 and has a channel (401) formed from a base (402) and two sidewalls (403). A mouth (404a) has two deflecting edges (405) that assist in stripping canes (2) from the wire (1). The base (402) extends to a nose (408) to a greater distance than the base (202) of the channel (201) of apparatus (100) to improve guiding ability by removing any abrupt wall ends to the channel (401).

Two locator members (406) are inclined with respect to the channel walls (403) and assist in guiding the wire (1) downwards into the channel (401) The locator members (406) also extend to 'wings' (407) that not only guide the wire (10 into the channel (401) but also help prevent canes from wrapping about the locator members (406) as could happen with the locator members (206) of the first embodiment.

The width of the channel (401) is also tapered rearward from a narrow mouth (404a) to a slightly wider rear end (404b).

In use of the apparatus (100) of the above described first embodiment, the wire (1) was found to occasionally push a detritus build-up rearward in the mouth (204a) and potentially block the channel (201). The tapered channel (401) ensures that the possibility of such build-up is minimal as any detritus in the mouth (404a) when pushed rearwards will be free to move through the progressively wider rear channel portion and will thus be more easily ejected from the rear end (404b).

The stripping mechanism (301) does not differ from the first embodiment and has blades (302) within walls (303a) of a housing (303) as in the first embodiment.

As in the first embodiment, the material guide (410) has a wheel (414) that fits inside a material guide channel (411) and forms an entry aperture (418) to the stripping mechanism (301) and line guide (400). The flanges (412) constrict and confine the canes (2) to within the channel (411) as the wire passes through.

The material guide (400) of the second preferred embodiment differs from the material guide (200) as a rim (415) of the wheel (414) and the channel locator members (413) each respectively have protrusions (416, 417). These protrusions (416, 417) help grip and guide canes later in the pruning season when they can become more rigid and often fail to be gripped by a comparable 'smooth' wheel, as in wheel (214). These 'older' canes could otherwise be pushed along the wire (1) by the wheel (414) and material guide channel (411) and fail to be cut or removed.

The apparatus (300) also has a pair of synthetic nylon or rubber rollers (305) that are positioned to the rear of the housing (303) to prevent the wire (1) from being bent, abraded or otherwise damaged as a result of exiting the channel end (404b) at a diverging angle to the longitudinal axis of the channel (401). The upper roller (305a) is attached to the cover (308) while the lower roller (305b) is attached to the rear of the housing (303). The resilience of the rollers (305) firmly holds the wire (1) to the rear of the apparatus (300) without abrading or otherwise damaging the wire (1) as it passes through.

Figure 13:
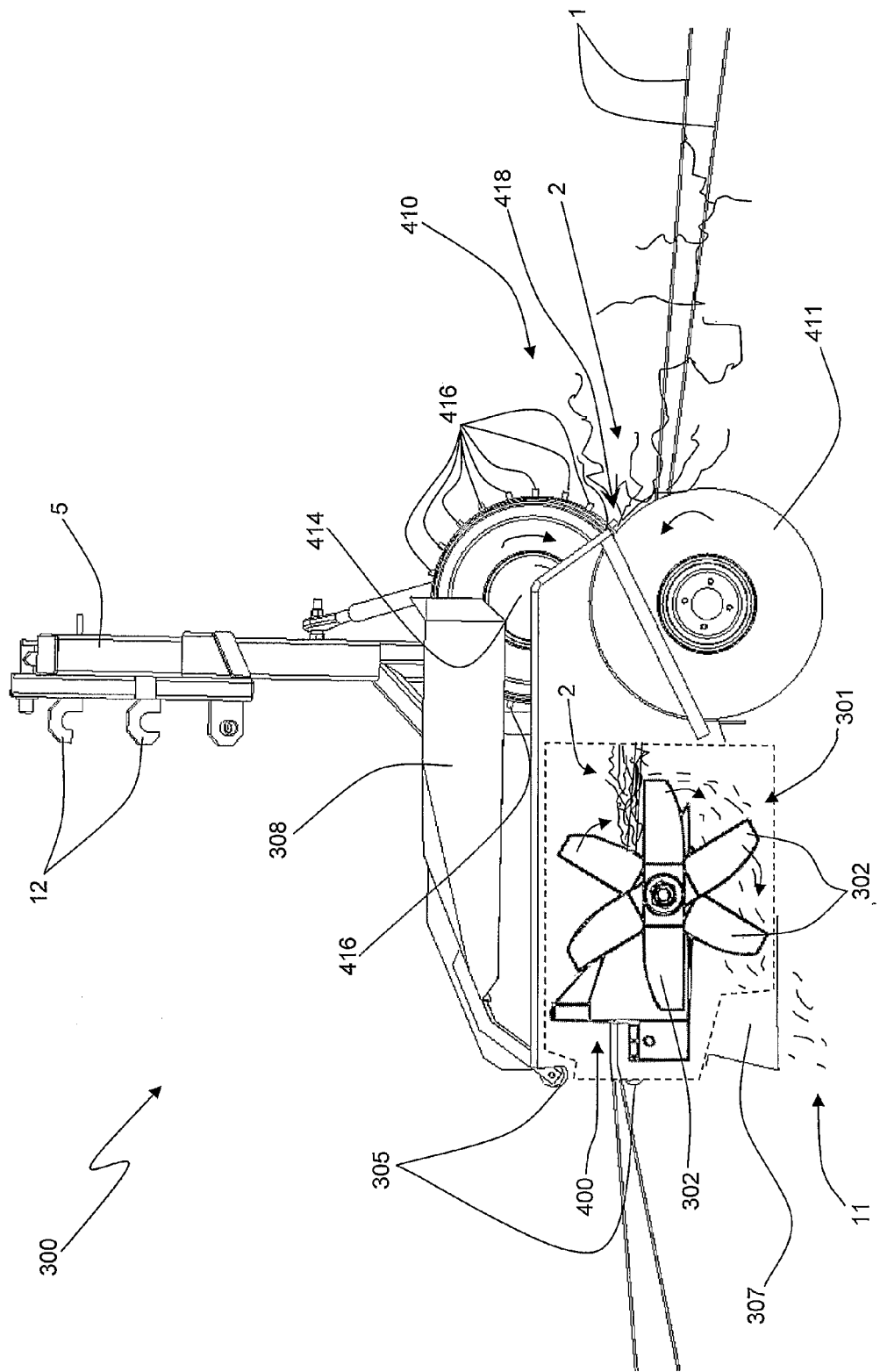
FIG. 13 shows an enlarged side elevation of the apparatus of FIG. 12 in operation with a partial cut-away view showing a stripping mechanism.
Figure 14:
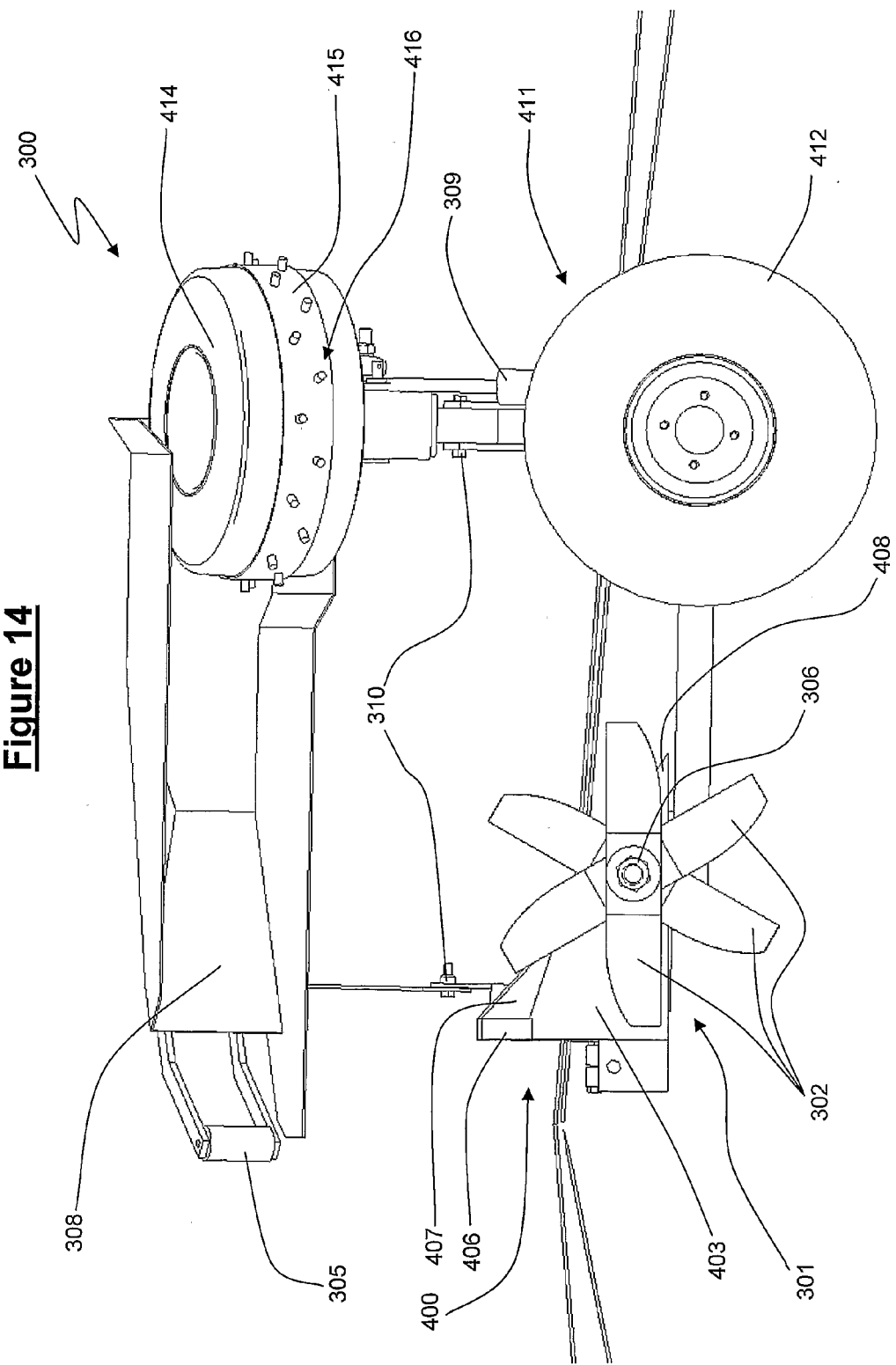
FIG. 14 shows a longitudinal cut-away side-view of the apparatus of FIGS. 12 and 13.
Figure 15:
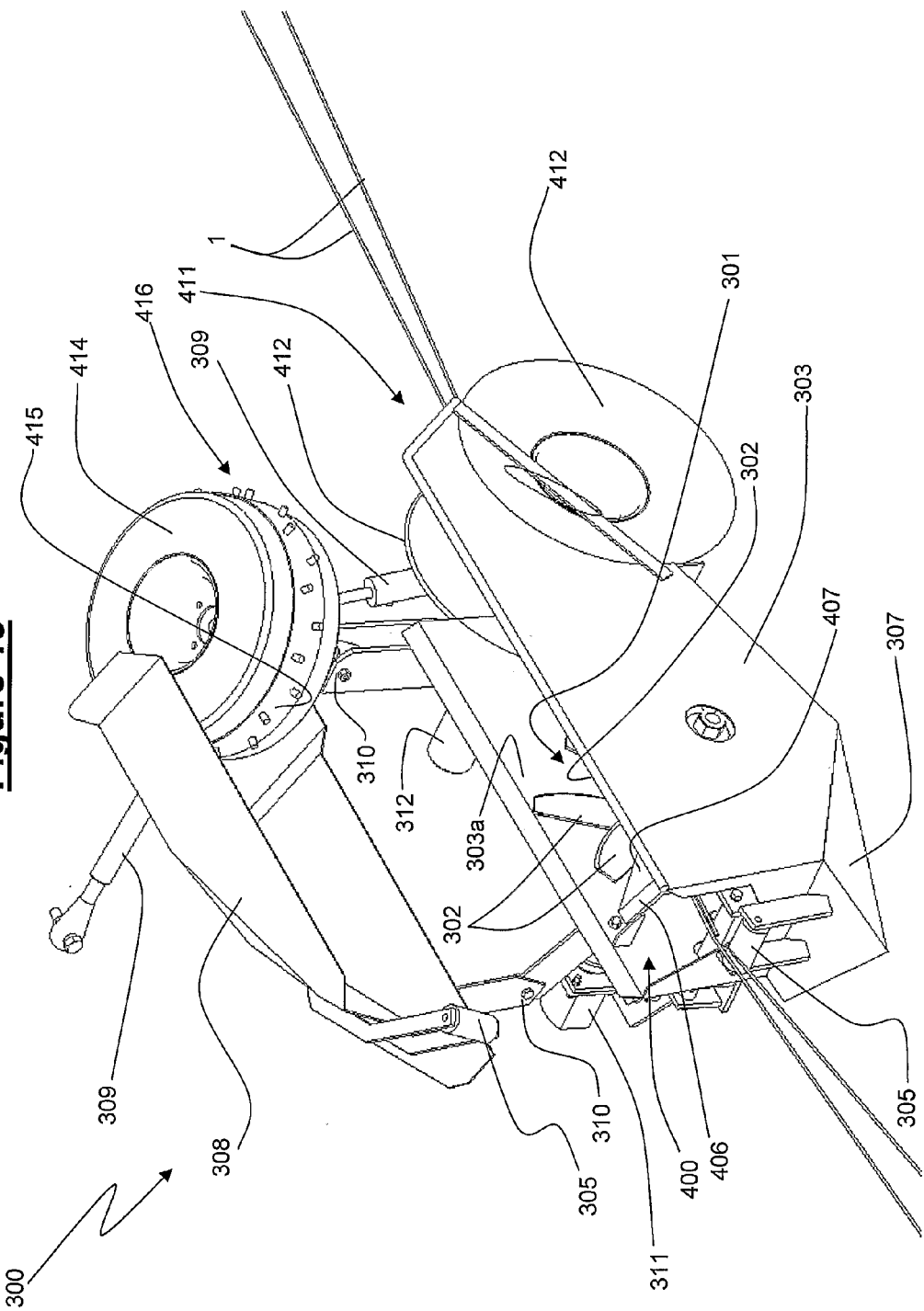
FIG. 15 shows a rear isometric view of the an apparatus of FIGS. 12-14.
Figure 16:
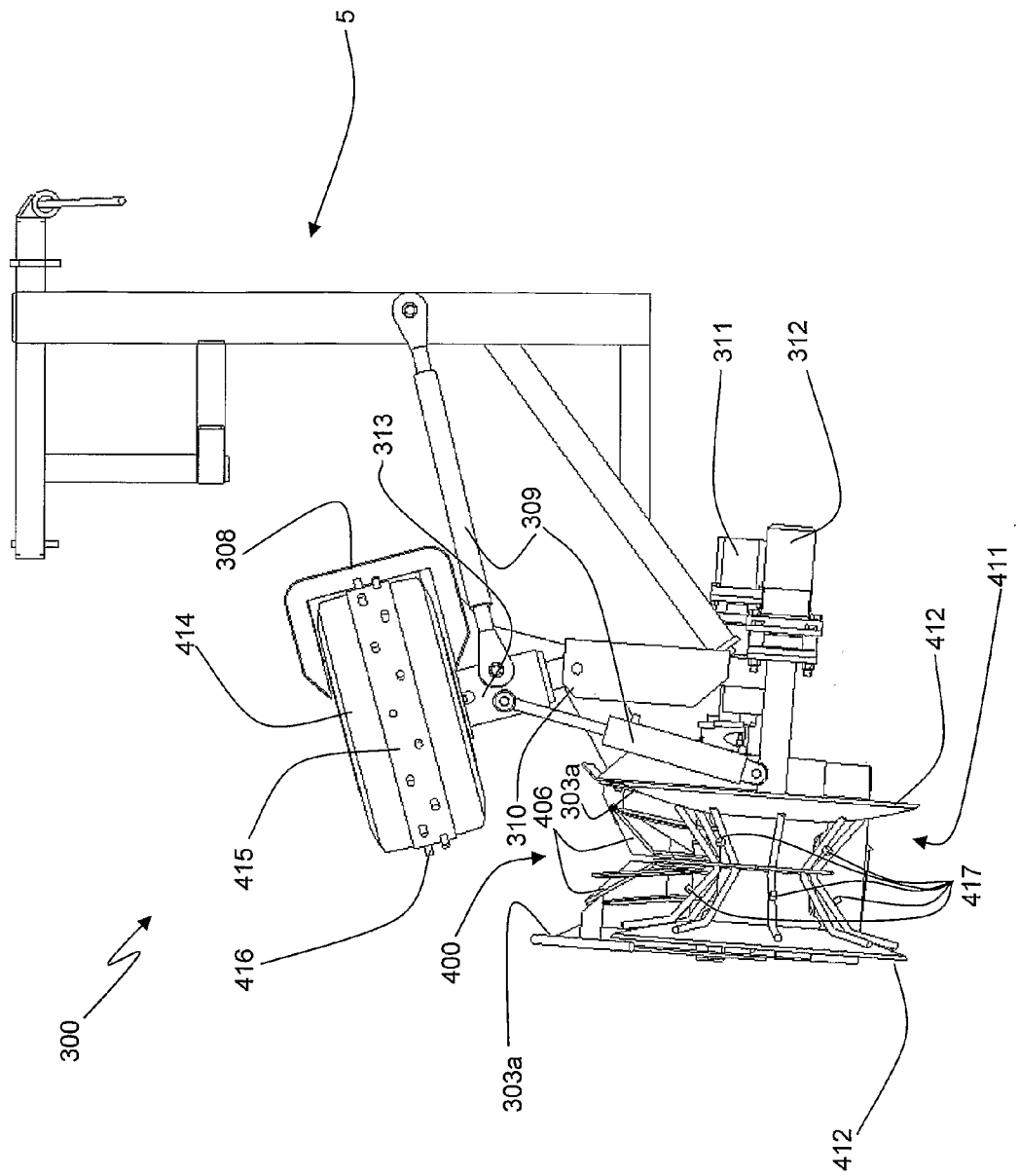
FIG. 16 shows a front elevation of the apparatus of FIGS. 12-14 with the cover in an open position.
Figure 17:
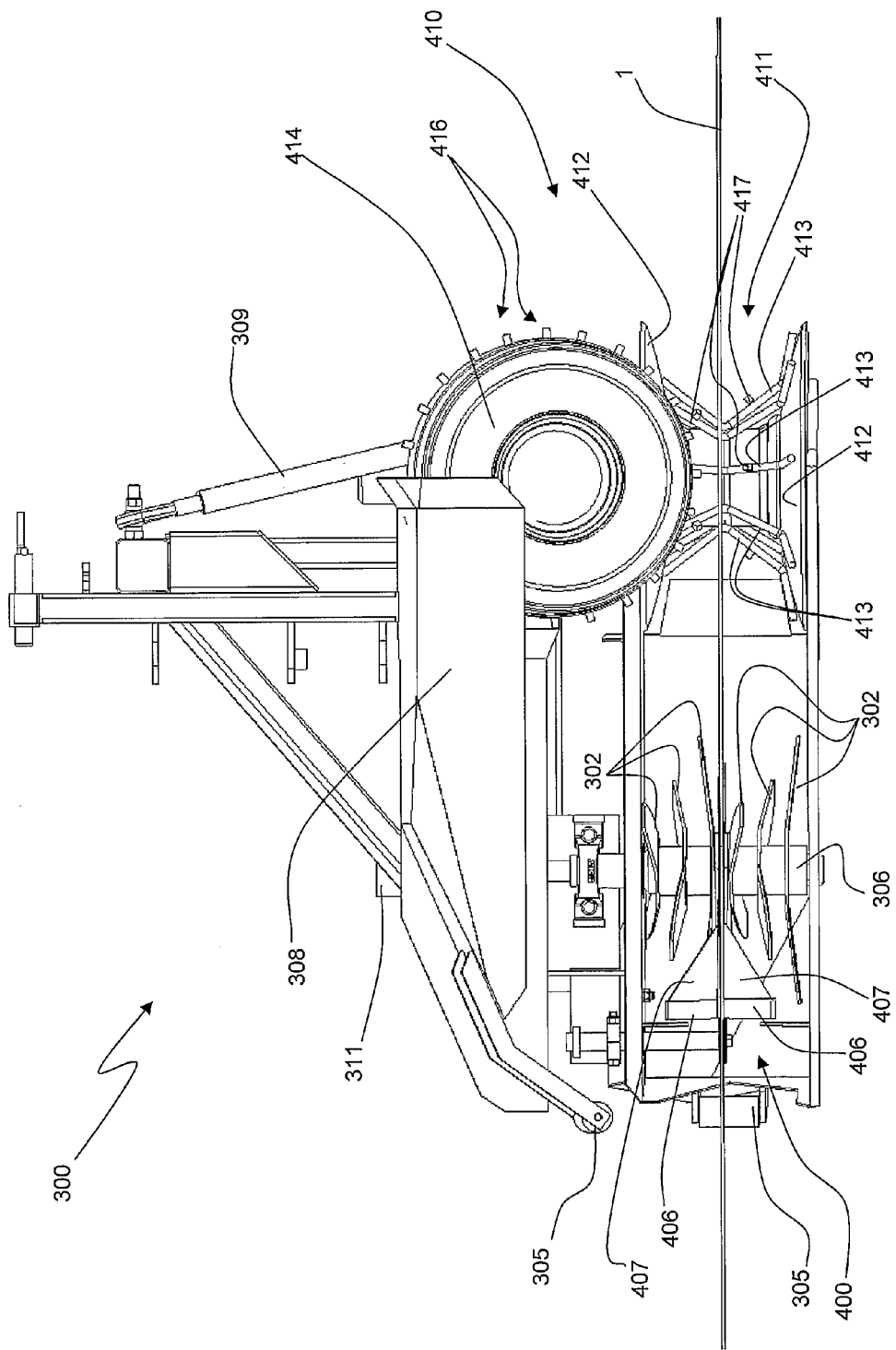
FIG. 17 shows a plan view of the apparatus of FIGS. 12-15 with the cover in the open position.

FIG. 13 shows a partial cut-away side elevation of the apparatus (300) with the stripping mechanism (301) operating to cut and strip the canes (2) from the wire (1) as it passes through the line guide (400) and material guide (410). The ejected cut material (11) is passed from the chute (307) onto the base of the vines (7). Arrows on the blades (302) indicate the direction of rotation.

The method of operation of the apparatus (100) will now be described with respect to FIGS. 9-11. It should be appreciated the apparatus (300) works in generally the same way.

It will also be appreciated that while the following method has been described using the apparatus (100) as described above, this method may also be used with any stripping apparatus capable of retaining a line and removing material thereon, e.g. a hook, chain, or any other system capable of guiding the line and removing material thereon.

The method of the present invention thus requires only that the wire (1) be releasably attached to the posts (3) and is detached and moved upwards and laterally away from the row of vines (7) before, or as it is being stripped.

FIG. 9 shows the basic operation of the apparatus (100) stripping canes (2) from two wires (1) and ejecting the cut material (11) in the direction indicated by arrow 6.

FIGS. 10 and 11 show a row of pruned grape-vines (7), two lifting wires (8) and a fruiting wire (9) which has cut canes (2) attached.

In prior art cane-pruning, the fruiting wire (9) is fixed to the posts (3). New growth from the canes (2) is guided by the lifting wires (8) which may be periodically lifted over the growing season to train the vines (7) into shape to assist in harvesting, maintenance and sunlight exposure. The lifting wires (8) are necessarily releasably attached to the posts (3) to permit lifting. However, as there is no detachability requirement, the fruiting wire (9) is typically fixed to the posts (3).

The present invention also provides a method of stripping the canes (2) from the wires (8, 9) extending between two end posts (4) (both shown in FIG. 10 only) and being releasably attached to one or more intermediate posts (3) of the row of grapevines (7). The wires (8, 9) are releasably attached to the posts (3) via line retention devices provided in the form of snap-fit plastic clips (10) (as shown more clearly in FIG. 19) although other known line retention devices may also be utilised.

The method generally comprises:
  detaching the releasably attached fruiting wire (9) and lifting wires (8) from the snap fit clips (10) on posts (3);
  ensuring the cover (108) is in the open position (see FIG. 8a);
  maneuvering the apparatus (100) such that the locator members (206) can contact the wires (8, 9) and guide them into the channel (201) as the apparatus (100) is lifted;
  lifting the boom to which the apparatus (100) is attached, and commensurately lifting wires (8, 9) so that the wires (8, 9) are pulled laterally away and upward from the posts (3);
  moving the cover (108) into the closed position (see FIG. 8b);
  actuating the hydraulic motors (111, 112, 113) to respectively rotate the hub (106), material guide channel (211) and wheel (214); and
  driving the tractor with the apparatus (100) along the row of vines (7) so that the apparatus (100) moves along the wire (1) to strip and cut the canes (2) therefrom.

The fruiting wire (9) is thus lifted upwards and to one side of the row of vines (7) so that the apparatus (100) does not contact and potentially damage the vines (7) as it moves along the wires (8, 9).

The lifting wires (8) do not typically have many canes (2) attached and therefore it is not imperative that the lifting wires (8) also be stripped. However, the lifting wires (8) are also lifted using this method as it has more convenient to also strip the lifting wires (8) than to leave the wires (8) in place. The lifting wires (8) if left in place may also impede lifting of the fruiting wire (9).

The prior art techniques of stripping canes (2) from the wires requires manual labour, or alternatively mobile machinery that must stop and start to move around the intermediate posts (3). Moreover, any vines that are to be retained are vulnerable to damage as the prior art machine strippers must move close to the posts and retained vines when stripping. In contrast, the present invention may alleviate both problems by moving the wires (8, 9) well clear of the posts and vines (7) before stripping. Consequently, the apparatus (100) is able to move uninterrupted along the length of wire (8, 9), removing the cut canes (2), while minimising the risk of damaging the vines (7).

FIG. 19 shows an exemplary plastic wire-retention clip (10) as described in New Zealand Patent No. 234467 by Brooke-Taylor. The clip (10) has two arms (13) with snap-fit channels (15) and a central aperture (14) for receiving a nail which is driven into the posts (3) to hold the clip in place. In use the wires (1, 8, 9) are placed in the channels (15) and are thereby held in place on the post (3).

Aspects of the present invention have been described by way of example only and it should be appreciated that modifications and additions may be made thereto without departing from the scope of the appended claims.

What is claimed:

1. An apparatus for stripping irregular material from a line during relative movement of the line through the apparatus, said apparatus including:
   a stripping mechanism;
   a material guide including upper and lower driven rotatable members between which the line passes, the rotatable members configured to constrict, compact, re-orientate and guide said irregular material attached to the line into engagement with the stripping mechanism during said relative movement;
   said stripping mechanism having at least one stripping element movable with respect to the line to impinge on the irregular material, thereby at least partially stripping the material from said line;
   a line guide for positioning the line therein and guiding the line during said relative movement, the at least one stripping element movable with respect to the line guide.

2. An apparatus as claimed in claim 1, wherein said line guide includes a channel with elongate walls extending between open distal ends.

3. An apparatus as claimed in claim 2, wherein one end of the channel forms a mouth, the mouth having one or more deflectors adapted to deflect material from the line when passing through the mouth.

4. An apparatus as claimed in claim 2, wherein the line guide includes at least one locator member extending to the channel and configured to guide the line impinging on the, or each, locator member into the channel.

5. An apparatus as claimed in claim 2, wherein a portion of the channel is tapered toward at least one of a said distal ends.

6. An apparatus as claimed in claim 1, wherein the at least one stripping element is rotatable about a rotation axis extending substantially orthogonal to the line during said relative movement.

7. An apparatus as claimed in claim 6, wherein the at least one stripping element is attached to a powered rotating hub rotatable about the rotation axis of the stripping element.

8. An apparatus as claimed in claim 1, wherein the at least one stripping element includes one or more blades.

9. An apparatus as claimed in claim 1, wherein the material guide is positioned in front of the line guide with respect to the direction of relative line movement through said line guide and is substantially 'in-line' with the line guide such that material entering the material guide is directed toward the line guide and stripping mechanism.

10. An apparatus as claimed in claim 1, wherein the rotatable members of the material guide form a constricting aperture therebetween for constricting the material as it passes through.

11. An apparatus as claimed in claim 10, wherein the rotatable members of the material guide include a material guide channel and a constricting member movable relative to each other between:
   a) a closed position, wherein the constricting member at least partially covers the material guide channel to form said constricting aperture, and
   b) an open position wherein the line can be located in the material guide channel.

12. An apparatus as claimed in claim 9, wherein the material guide channel is formed as an annular groove at least partially circumscribing an outer surface of each rotatable member.

13. An apparatus as claimed in claim 11, wherein the material guide channel and constricting member are contra-rotatable.

14. An apparatus as claimed in claim 1, wherein the line guide and the stripping mechanism are located substantially within at least two side walls of a housing.

15. An apparatus as claimed in claim 14, wherein the material guide is substantially coterminous with the walls of the housing.

16. An apparatus as claimed in claim 1, wherein the material guide includes one or more locator members configured with two inclined members joined at an intersection co-incident with the line guide.

17. An apparatus as claimed in claim 1, further including at least one roller provided in a position co-incident with an end of the line guide and rotatable about an axis extending substantially transverse to the line.

18. An apparatus as claimed in claim 1, further including a cover movable between a closed position—to at least partially cover the stripping mechanism, and an open position—wherein the stripping mechanism is substantially uncovered.

19. An apparatus as claimed in claim 1, wherein the stripping mechanism includes at least two said stripping elements, the line passing between the stripping elements during said relative movement.

20. A method of stripping organic material from a line extending between two end supports and being releasably attached to one or more intermediate supports, said method using an apparatus including:
   a stripping mechanism
   a material guide including upper and lower driven rotatable members between which the line passes, the rotatable members configured to constrict, compact, re-orientate and guide said irregular material attached to the line into engagement with the stripping mechanism during said relative movement;
   said stripping mechanism having at least one stripping element movable with respect to the line, said stripping element being configured in use to impinge on the irregular material, thereby at least partially stripping the material from said line;
   a line guide for positioning the line therein and guiding the line during said relative movement, the at least one stripping element movable with respect to the line guide;
   said method including the steps of:
   detaching the line from at least one said intermediate support and laterally displacing the line away from same;
   positioning said line in the line guide and material guide; and
   moving the line guide, material guide and stripping mechanism along the line past the, or each, intermediate support to strip the organic material therefrom.

* * * * *